United States Patent
Yang et al.

(10) Patent No.: US 11,625,814 B2
(45) Date of Patent: Apr. 11, 2023

(54) TEMPORAL FEATURE ALIGNMENT NETWORK FOR VIDEO INPAINTING

(71) Applicant: Lemon Inc., Grand Cayman (KY)

(72) Inventors: Linjie Yang, Los Angeles, CA (US); Ding Liu, Los Angeles, CA (US); Xueyan Zou, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 79 days.

(21) Appl. No.: 17/192,549

(22) Filed: Mar. 4, 2021

(65) Prior Publication Data
US 2022/0284552 A1  Sep. 8, 2022

(51) Int. Cl.
| | |
|---|---|
| G06K 9/00 | (2022.01) |
| G06T 5/00 | (2006.01) |
| G06N 3/08 | (2023.01) |
| G06T 3/00 | (2006.01) |

(52) U.S. Cl.
CPC ............. *G06T 5/006* (2013.01); *G06N 3/08* (2013.01); *G06T 3/0093* (2013.01); *G06T 5/005* (2013.01); *G06T 2207/10016* (2013.01); *G06T 2207/20081* (2013.01); *G06T 2207/20084* (2013.01)

(58) Field of Classification Search
CPC ....... G06T 5/006; G06T 3/0093; G06T 5/005; G06T 2207/10016; G06T 2207/20081; G06T 2207/20084; G06N 3/08
USPC ........................................................ 382/156
See application file for complete search history.

(56) References Cited

U.S. PATENT DOCUMENTS

2006/0257042 A1* 11/2006 Ofek .................. H04N 5/23248
382/255

OTHER PUBLICATIONS

Xu, Rui, et al. "Deep flow-guided video inpainting." Proceedings of the IEEE/CVF Conference on Computer Vision and Pattern Recognition. 2019. (Year: 2019).*
Ding, Yifan, et al. "Frame-recurrent video inpainting by robust optical flow inference." arXiv preprint arXiv:1905.02882 (2019). (Year: 2019).*
Luo, Kunming, et al. "Occinpflow: Occlusion-inpainting optical flow estimation by unsupervised learning." arXiv preprint arXiv: 2006.16637 (2020). (Year: 2020).*

(Continued)

*Primary Examiner* — Jonathan S Lee
(74) *Attorney, Agent, or Firm* — Faegre Drinker Biddle & Reath LLP

(57) ABSTRACT

Systems and methods are directed to inpainting video. More specifically, initial video data including a sequence of image frames containing missing or corrupted pixel information may be received. Optical flow displacement values and optical flow validity masks may be generated for neighboring image frames of initial video data. Image features from image feature maps of one or more neighboring image frames may be warp-shifted to image feature maps of a current image frame using the optical flow displacement values and warp-shifted image features from the feature maps of the one or more neighboring image frames may be selected based on one or more of the optical flow validity masks. A sequence of complete image frames may be generated based on the selected warp-shifted image features from the feature maps of the one or more neighboring image frames and image features from the image feature maps of the current image frame.

17 Claims, 14 Drawing Sheets

(56) References Cited

OTHER PUBLICATIONS

Zou, Xueyan, et al. "Progressive temporal feature alignment network for video inpainting." Proceedings of the IEEE/CVF Conference on Computer Vision and Pattern Recognition. 2021. (Year: 2021).*

Vogel, Christoph, Patrick Knöbelreiter, and Thomas Pock. "Learning energy based inpainting for optical flow." Asian Conference on Computer Vision. Springer, Cham, 2018. (Year: 2018).*

Gao, C., et al. (2020). Flow-edge Guided Video Completion. In: Vedaldi, A., Bischof, H., Brox, T., Frahm, JM. (eds) Computer Vision—ECCV 2020. ECCV 2020. Lecture Notes in Computer Science( ), vol. 12357. Springer, Cham., pp. 1-17.

Ilg, E., et al., "FlowNet 2.0: Evolution of Optical Flow Estimation with Deep Networks," Proceedings of the IEEE Conference on Computer Vision and Pattern Recognition (CVPR), 2017, pp. 2462-2470.

\* cited by examiner

TEMPORAL FEATURE ALIGNMENT NETWORK FOR VIDEO INPAINTING

BACKGROUND

Video inpainting generates plausible content for missing and/or corrupt regions of video frames. Video inpainting is often used to restore corrupted video, remove watermarks/logos, and to remove other undesired objects that may appear in one or more frames of video. In video inpainting, information of the missing, or inpainted region, can be retrieved from nearby frames due in part to the temporal consistency of videos. Traditional methods widely used in video inpainting include patch-based methods that generate plausible results under certain conditions (e.g. repetitive patterns, similar textures, etc.); however, such patch-based techniques often require high computational costs. Deep learning based video inpainting methods have been proposed to provide a more efficient and effective manner of performing inpainting. Three main deep learning approaches exist that generate content for corrupt and/or missing regions in video frames. Such approaches include attention based mechanisms, flow guided approaches, and three-dimensional (3D) convolutional networks. Each of these methods use different techniques to utilize information from neighboring frames to generate inpainted content. Attention based methods retrieve information from neighboring frames using a weighted sum; such attention based inpainting approaches tend to lead to blurry results. Flow guided approaches generate higher resolution results but are sensitive to errors that exist in the flow maps. 3D convolutional networks are efficient when utilizing an end-to-end structure; however, 3D convolutional networks rely more on generating hallucinated image content rather than retrieving corresponding information from neighboring frames.

Other inpainting approaches rely on optical flow from corrupted videos frames and then utilize other flow inpainting techniques to generate content for unknown regions. Using optical flow, pixels in corrupted regions are propagated from adjacent frames. Other image inpainting techniques may then be applied to complete or generate the rest of the missing content. Although optical flow methods are good at spatial content alignment and may inpaint video frames with higher resolution when compared to attention or 3D convolution models, such methods lack the capability of preserving fine-grained structures and may magnify errors in optical flow through pixel propagation. In addition, optical flow based image inpainting techniques may generate unwanted content that otherwise does not exist in ground truth frames.

It is with respect to these and other general considerations that embodiments have been described. Although relatively specific problems have been discussed, it should be understood that the examples described herein should not be limited to solving the specific problems identified in the background above.

SUMMARY

In accordance with examples of the present disclosure, systems and methods directed to video inpainting are described that utilize the advantages offered by temporal convolutional frameworks together with optical flow based warping approaches. More specifically, an end-to-end deep network with a temporal shift-and-alignment module (TSAM) is proposed. In examples, image features between neighboring video frames are warped using optical flow techniques prior to being shifted. In addition, the application of a temporal shift-and-alignment module may be applied to image feature maps with different scales and network depths to adequately propagate frame features in a coarse and/or fine-grained manner.

In accordance with at least one example of the present disclosure, a method for inpainting a sequence of initial image frames is described. The method may include receiving initial video data representing a sequence of initial image frames, generating optical flow displacement values between neighboring image frames of the sequence of initial image frames, warp-shifting image features from image feature maps of one or more neighboring image frames to image feature maps of a current image frame using the optical flow displacement values, and generating a sequence of complete image frames based on warp-shifted image features from the feature maps of the one or more neighboring image frames and image features from the image feature maps of the current image frame, the sequence of complete image frames including an inpainted version of the sequence of initial image frames.

In accordance with at least one example of the present disclosure, a system configured to perform video inpainting is described. The system may include a processor, and memory including instructions, which when executed by the processor, causes the processor to: receive initial video data representing a sequence of initial image frames, generate optical flow displacement values between neighboring image frames of the sequence of initial image frames, at one or more encoding layers and at one or more decoding layers of a trained convolutional neural network, warp-shift image features from image feature maps of one or more neighboring image frames to image feature maps of a current image frame using the optical flow displacement values, and generate a sequence of complete image frames based on warp-shifted image features from the feature maps of the one or more neighboring image frames and image features from the image feature maps of the current image frame, the sequence of complete image frames including an inpainted version of the sequence of initial image frames.

In accordance with at least one example of the present disclosure, a computer-readable storage medium is described. The computer-readable medium may include instructions, which when executed by a processor, cause the processor to: receive initial video data representing a sequence of initial image frames, generate optical flow displacement values between neighboring image frames of the sequence of initial image frames, generate optical flow validity masks for respective image frames of the sequence of image frames based on the optical flow displacement values, warp-shift image features from image feature maps of one or more neighboring image frames to image feature maps of a current image frame using the optical flow displacement values, select warp-shifted image features from the feature maps of the one or more neighboring image frames and image features from the image feature maps of the current image frame based on one or more of the optical flow validity masks, and generate a sequence of complete image frames based on the selected warp-shifted image features from the feature maps of the one or more neighboring image frames and the selected image features from the image feature maps of the current image frame, the sequence of complete image frames including an inpainted version of the sequence of initial image frames.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
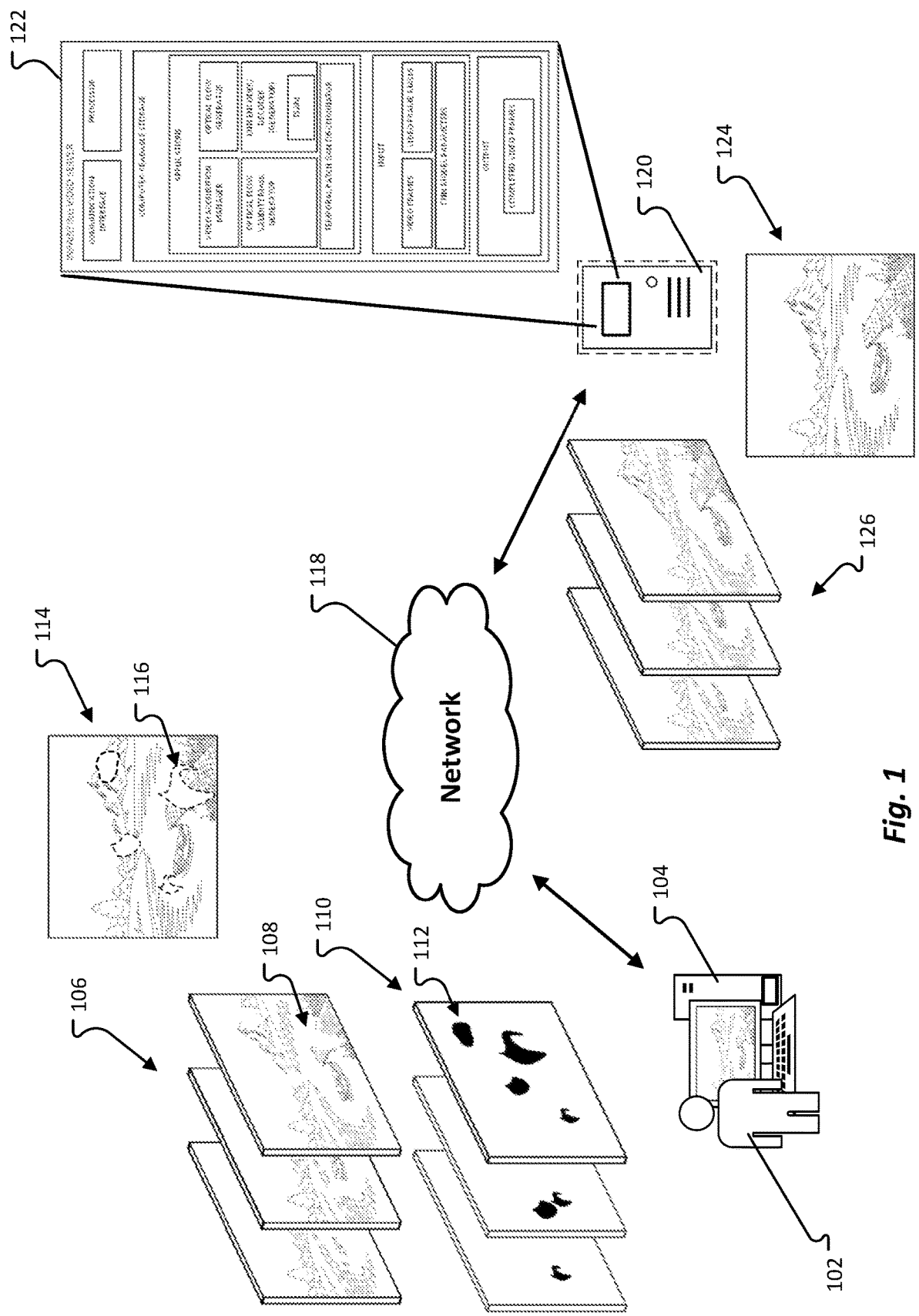
FIG. 1 depicts an example video inpainting system in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In video inpainting, information of the inpainted region can be retrieved from nearby frames thanks to the temporal consistency of videos. Traditional methods including a patch-based method are widely used in video inpainting. Patch-based methods may generate plausible results under certain conditions but often require high computational costs. Recently, deep learning based video inpainting methods have been proposed to reduce the computational costs and perform video inpainting in a more efficient and effective manner. Attention based mechanisms, flow guided approaches, and 3D convolutional networks have been proposed. These methods use different techniques to borrow information from neighboring frames and generate missing content. Attention based methods retrieve information from neighboring frames using a weighted sum. Flow guided approaches may provide higher resolution results but are generally sensitive to errors that may occur in the pre-computed flow maps. While 3D convolutional networks are efficient, they often generate hallucinated image content rather than retrieving corresponding information from neighboring frames. Accordingly, by combining the ideas of 3D convolutional networks and flow-guided approaches, examples of the present disclosure provide an end-to-end 3D convolutional framework with an embedded temporal shift-and-alignment module that facilitates accuracy with respect to temporal feature alignment and propagation.

Video inpainting can be formulated as a conditional pixel prediction task: given ordered input video frames $X^T=[f_1, f_2, \ldots f_T]$ with corrupted regions $M=[m_1, m_2, \ldots m_T]$, the objective is to predict the original video $Y^T=[F_1, F_2, \ldots F_T]$, where each $m_i$ is a binary mask with the same resolution as the video frames and where "0" indicates the pixel is missing or corrupted and "1" means the pixel is valid.

In accordance with examples of the present disclosure, a temporal feature alignment network model for video inpainting may include a ResNet based generator, a skip connected decoder, and a temporal patch GAN discriminator. The ResNet based generator may have first convolution layers of a bottleneck block replaced with a temporal shift-and-alignment module (TSAM) convolution layer. The TSAM convolution layer takes both feature maps and optical flow as input. The TSAM convolution layer may shift the image features of neighbor frames and then warp the shifted image features to the correct spatial location at the current shifted time stamp using optical flow. A gated convolution signal may be used to emphasize and/or deemphasize image features and may be generated using an original feature map through a convolution layer and a sigmoid layer. The final output of the TSAM convolution module may be a dot product between computed image features and the gated convolution signal.

The skip connected decoder may include multiple gated deconvolution layers, multiple TSAM convolution layers having a gated convolution signal, and multiple convolution layers may be used for dimension reduction. In examples, the composition of the encoder and decoder inpaints unknown pixels by borrowing information from neighboring frames via 3D convolution, and then hallucinates content using an adversarial loss model. Accordingly, a temporal patch generative adversarial network (GAN) discriminator may enforce spatial temporal features that follow the ground truth target distribution.

In examples, a TSAM module as part of the TSAM convolution layer performs at least three functions. The TSAM module may shift warped features between neighbor frames; warp the shifted features to the correct spatial alignment at the current timestamp using optical flow; and aggregate the aligned features with the original features using a validity mask. An optical flow module may generate optical flow for the TSAM module based on the neighboring video frames. Optical flow may be defined as the offsets from corresponding pixels in a pair of images ($I^t$, $I^{t+\Delta t}$), where t is a small time interval and in which the offsets ($\Delta x$, $\Delta y$) are generally generated as $I^t(x, y)=I^{t+\Delta t}(x+\Delta x, y+\Delta y)$. The collection of the offsets on an image is defined as a flowmap F. Although current optical flow methods can generate accurate results and accurate flowmaps using real world videos, it remains challenging to produce correct optical flow results when encountering cases such as occlusion and where fast motion may exist. Instead, such optical flow results may be inaccurate in these cases. As an example, pixels correspondence between neighboring frames may present issues. Thus if the warped features are used for feature aggregation, misaligned pixels still exist and may cause issues due in part to occlusion and the existence of fast motion.

Accordingly, a flow validity mask may be generated to mark reliable pixels in the optical flow. The flow validity mask may be a mask indicating which pixels in the optical flow are generally thought to be accurate and which pixels in the optical flow are generally thought to be inaccurate. A validity mask can be computed for both forward and backward flow due to the cycle structure of optical flow between two images. Once the optical flows and corresponding validity masks have been generated, the optical flows and corresponding validity masks are provided to the TSAM module. Thus, shifted features from neighboring frames using optical flow may be warped.

The flow warp operation may include shifting features between neighboring frames. The flow warp operation further includes warping the shifted features to its current timestamp using reverse flow. Lastly, the final shifted features based on the warped features and original features may be obtained using the optical validity mask. The resulting feature maps may be concatenated along the channel dimension and passed for further computation. A TSAM module may be included in every bottleneck block in the encoding stage of the network and also included in the convolution layers in the decoding stage. The output of the encoder/decoder module may be an inpainted image having a resolution that is the same as the input resolution.

FIG. 1 depicts an example video inpainting system 100 in accordance with examples of the present disclosure. A user 102 may acquire or otherwise obtain a video clip, or sequence of images 106. The sequence of images 106 may include various regions 108 in various images of the sequence of images 106, where accurate pixel information is absent. For example, an image 114 may represent an image of the sequence of images 106. A region 116 of the image 114 may be missing pixel information for a variety of reasons. One reason may be that the pixel information is corrupt; another reason may be that an object has been removed from the video. Accordingly, a user 102 desiring to have a complete video with completed regions 116, may utilize an inpainting video server 122 to fill or otherwise generate the pixel information for the missing or corrupt regions 116. The sequence of images 106, or initial video data, may refer to a video clip; each image in the sequence of images 106 may include multiple channels. An example of a channel may be a red color channel, a green color channel, and/or a blue color channel. Of course other channels are certainly contemplated.

In examples, the user 102 may utilize a computing device 104 to acquire and transmit the sequence of images 106 to the inpainting video server 122 via the network 118. The computing device 104, although depicted as a desktop computer for example, may be any one of a portable or non-portable computing device. For example, the computing device 104 may be a smartphone, a laptop, a desktop, a server. The sequence of images 106 may be acquired in any format and may be compressed and/or decompressed form. In addition, a sequence of pixel mask images 110 may also be acquired and transmitted to the inpainting video server 122 via the network 118. The sequence of pixel mask images 110 may include pixel mask regions 112 corresponding to the missing or corrupted regions 108 of the sequence of images 106. As each image of the sequence of images 106 may include different regions 108 having absent, missing, or corrupt pixel data, each pixel mask image of the sequence of pixel mask images 110 may include different pixel mask regions 112 corresponding to the respective regions 108. In examples, a user 102 may utilize the computing device 104 to generate one or more of the pixel mask regions 112. For example, a user may edit a video image to remove a watermark, object, or otherwise. In some examples, a video editing application may identify the pixel mask regions 112 for the sequence of pixel mask images 110 from an initial user selection. That is, a user may select a watermark in an image frame of video clip for removal; the video editing application or service may remove the watermark in all image frames of the video clip. By removing the selected watermark in all image frames of the video clip, regions 108 containing inaccurate or otherwise missing pixel data may be generated. The video editing application and/or service may generate the sequence of pixel mask images 110 based on the inaccurate or otherwise missing pixel data. As another example, a user may mark, or identify, an area within an image frame of a video clip. The marked or identified area may then be used to generate the sequence of pixel mask images 110.

In examples, the sequence of pixel mask images 110 and the sequence of images 106 may be provided to the inpainting video server 122. The inpainting video server 122 may receive the sequence of images 106 and generate an optical flow field for pixels in each image frame of the sequence of images 106. Optical flow is a per pixel prediction used to estimate how the pixel's brightness moves across an image over time. In examples, optical flow may be generated in the forward direction (e.g., a displacement vector based on a current image frame at t=t and subsequent image frame at t=t+Δt) and the backward direction (e.g., a displacement vector based on a current image frame at t=t and previous image frame at t=t−Δt).

In instances of occlusion and/or where fast motion exists, correct optical flow calculations may be difficult to obtain because an incorrect pixel in a subsequent or previous image frame may be identified as corresponding to a pixel in a current frame. That is, identifying pixels in subsequent and/or previous image frames based on pixel values (e.g., rbg values for example) may lead to identifying an incorrect pixel having the same pixel value, but not corresponding to the pixel in the current image frame. Accordingly, an optical flow validity mask may be generated by evaluating the distance between a pixel location of a first pixel in a first image frame and a corresponding mapped pixel location in the first image frame. If the distance between the pixel location and the mapped pixel location is less than a threshold value, the optical flow is considered to be correct and may be differentiated from those areas of optical flow that are considered to be incorrect (e.g., distance greater than the threshold value) utilizing the optical flow validity mask. For example, correct areas of optical flow may be equal to "1" in the optical flow validity mask while incorrect areas of optical flow may be equal to "0".

Once the optical flows and corresponding optical flow validity masks have been generated, the optical flows and corresponding optical flow validity masks are applied to the TSAM module in bottleneck blocks in the encoding stage of a convolutional neural network encoder/decoder module. The TSAM convolution may shift the image features of neighbor frames and then warp the shifted image features to the correct spatial location at the current shifted time stamp using optical flow. A gated convolution signal may be used to emphasize and/or deemphasize image features and may be generated using an original feature map through a convolution layer and a sigmoid layer. The final output of the TSAM Convolution layer may be a dot product between computed image features and the gated convolution signal.

The skip connected decoder may include multiple gated deconvolution layers, multiple TSAM convolution layers having a gated convolution signal, and multiple convolution layers may be used for dimension reduction. In examples, the composition of the encoder and decoder inpaints unknown pixels by borrowing information from neighboring frames via 3D convolution, and then hallucinates content using an adversarial loss model. Accordingly, a temporal patch generative adversarial network (GAN) discriminator may enforce spatial temporal features that follow the ground truth target distribution. The inpainting video server 122 may then provide, or otherwise make available to the user, the completed sequence of images 126, where each image in the sequence of images 126 includes inpainted content. For example, an image 124 corresponding to image 114 may appear to be complete or otherwise include plausible content in regions previously having missing or corrupt pixel values, such as regions 116.

Figure 2:
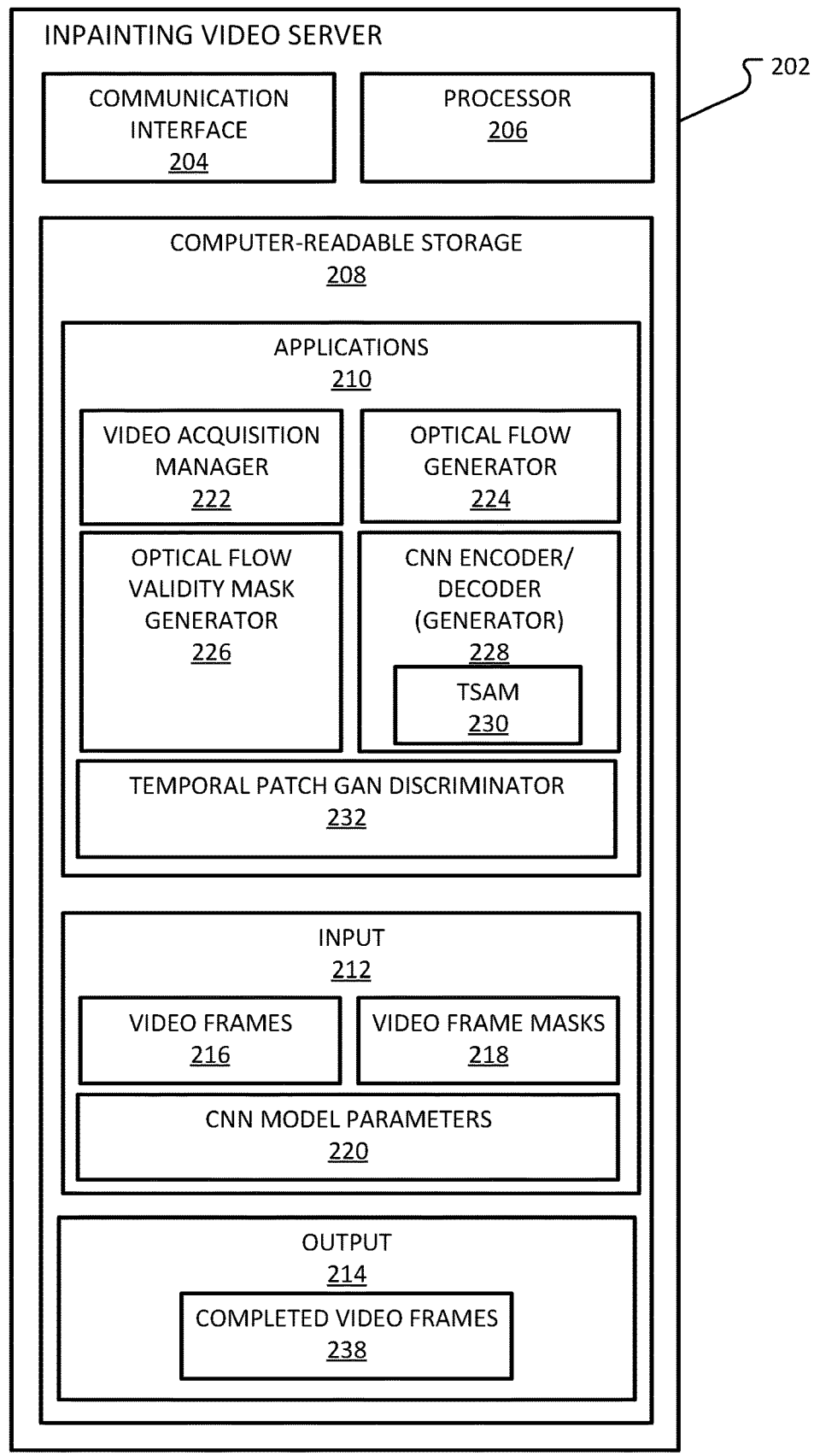
FIG. 2 depicts details of an inpainting video server in accordance with examples of the present disclosure.

FIG. 2 depicts details of the inpainting video server 202 in accordance with examples of the present disclosure. The inpainting video server 202 may be the same as or similar to the inpainting video server 122 previously described. The inpainting video server 202 may include a communication interface 204, a processor 206, and a computer-readable storage 208. In examples, the communication interface 204 may be coupled to a network and receive the sequence of images 106 and sequence of pixel mask images 110; the sequence of images 106 may be stored as video frames 216 and the sequence of pixel mask images 110 may be stored as video frame masks 218. In some examples, one or more CNN model parameters may also be received at the communication interface 204 and stored as the CNN model parameters 220. The CNN model parameters 220 may include one or more parameters and hyperparameters that define the CNN model. In examples, the CNN model parameters 220 may correspond to a specific CNN implementation that is to be implemented at the inpainting video server 202. For example, the CNN model parameters 220 may refer to a selection of a specific model (e.g., a specific model trained with a specific set of training data) that is made by a user. While the video frames 216, video frame masks 218, and CNN model parameters are depicted as being input 212, other information and input may be received at the communication interface 204 and stored as input 212.

In examples, one or more applications 210 may be provided by the inpainting video server 202. The one or more applications 210 may include a video acquisition manager 222, an optical flow generator 224, an optical flow validity mask generator 226, the CNN encoder/decoder 228 and a temporal patch GAN discriminator 232. The video acquisition manager 222 may manage the acquisition of sequence of images, such as the sequence of images 106 and the sequence of pixel mask images 110. The video acquisition manager 222 may store the received images as input 212 as previously described.

Based on the received sequence of images, the optical flow generator 224 may generate forward and backward optical flow fields for use by the optical flow validity mask generator 226 and the CNN encoder/decoder 228. Optical flow is a per pixel prediction used to estimate how the pixel's brightness moves across an image over time. Optical flow assumes that $I(x, y, t)=I(x+\Delta x, y+\Delta y, t+\Delta t)$; that is, the pixel characteristic at time t (i.e. rgb values) is the same as the pixel characteristics at $t=t+\Delta t$ but at a different location (denoted by $\Delta x$ and $\Delta y$), where the change in location is what is predicted by the flow field. In examples, optical flow may be generated in the forward direction (e.g., a displacement vector based on a current image frame at t=t and subsequent image frame at $t=t+\Delta t$) and the backward direction (e.g., a displacement vector based on a current image frame at t=t and previous image frame at $t=t-\Delta t$).

In instances of occlusion and/or where fast motion exists, correct optical flow calculations may be difficult to obtain because an incorrect pixel in a subsequent or previous image frame may be identified as corresponding to a pixel in a current frame. That is, identifying pixels in subsequent and/or previous image frames based on pixel values (e.g., rbg values for example) may lead to identifying an incorrect pixel having the same pixel value, but not corresponding to the pixel in the current image frame. Accordingly, an optical flow validity mask may be generated by evaluating the distance between a pixel location of a first pixel in a first image frame and a corresponding mapped pixel location in the first image frame. For example, correct areas of optical flow may be equal to "1" in the optical flow validity mask while incorrect areas of optical flow may be equal to "0".

Once the optical flows and corresponding optical flow validity masks have been generated, the optical flows and corresponding optical flow validity masks are provided to the TSAM module 230 in bottleneck blocks in the encoding stage of a convolutional neural network encoder/decoder module. The TSAM module may shift the image features of neighbor frames and then warp the shifted image features to the correct spatial location at the current shifted time stamp using optical flow. A gated convolution signal may be used to emphasize and/or deemphasize image features and may be generated using an original feature map through a convolution layer and a sigmoid layer. The final output of the TSAM Convolution layer may be a dot product between computed image features and the gated convolution signal.

The skip connected decoder may include multiple gated deconvolution layers, multiple TSAM convolution layers having a gated convolution signal, and multiple convolution layers may be used for dimension reduction. In examples, the composition of the encoder and decoder inpaints unknown pixels by borrowing information from neighboring frames via 3D convolution, and then hallucinates content using an adversarial loss model. Accordingly, a temporal patch generative adversarial network (GAN) discriminator 232 may enforce spatial temporal features that follow the ground truth target distribution. Accordingly, resulting from the CNN encoder/decoder 228 and/or the temporal patch GAN discriminator 232, inpainted images of the input image sequences may be stored as completed video frames 238. Of course, other output 214 may be generated; for example, the optical flow may be output in some examples.

Figure 3:
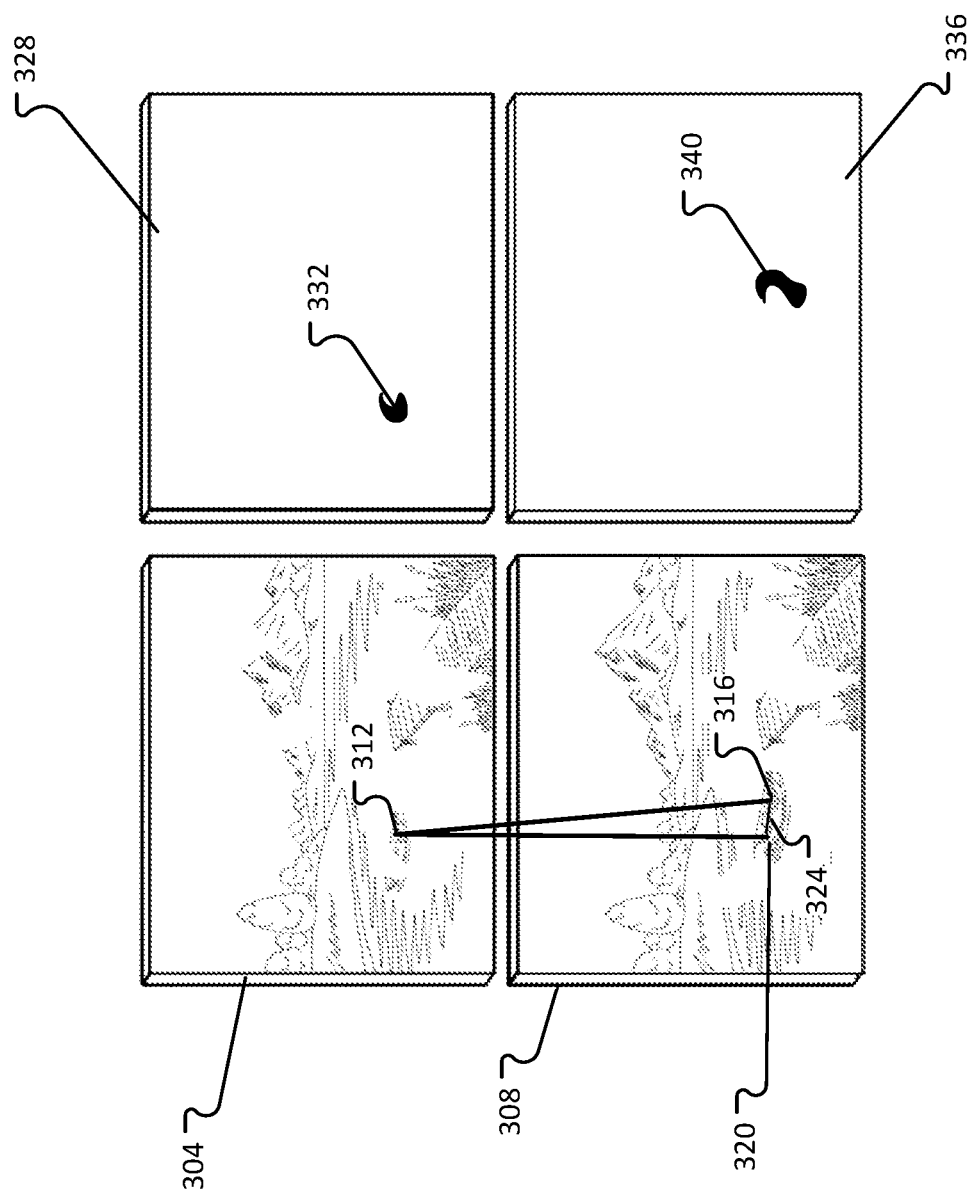
FIG. 3 depicts details directed to generating an optical flow validity mask in accordance with examples of the present disclosure.

FIG. 3 depicts additional details directed to generating an optical flow validity mask in accordance with examples of the present disclosure. As depicted in FIG. 3, a first image frame 304 and a second image frame 308 may be temporally adjacent to one another. As previously discussed, optical flow is a per pixel prediction used to estimate how the pixels brightness moves across an image over time. Optical flow assumes that $I(x, y, t)=I(x+\Delta x, y+\Delta y, t+\Delta t)$; that is, the pixel characteristic at time t (i.e. rgb values) is the same as the pixel characteristics at $t=t+\Delta t$ but at a different location (denoted by $\Delta x$ and $\Delta y$), where the change in location is what is predicted by the flow field. For example, an rgb value at a time equal to t (e.g., t=t) may be (255, 255, 255) at x, y position (20, 20) in an image frame. Accordingly, at $t=t+\Delta t$, the same rgb value (255, 255, 255) will still exist in the image frame and if there is motion, it will exist at a different part of the frame i.e. (26, 30). Thus the optical flow displacement vector for this motion will be (6, 10). This means that the original pixel position (e.g., 20,20) at t=t together with the displacement vector (e.g., [10,6]), can be used to obtain a corresponding pixel position at (t=t+Δt). In examples, optical flow may be generated in the forward direction (e.g., a displacement vector based on a current image frame at t=t and subsequent image frame at t=t+Δt) and the backward direction (e.g., a displacement vector based on a current image frame at t=t and previous image frame at t=t−Δt).

As one example, a pixel 316 in the second image frame 308 may correspond to a pixel 312 in the first image frame. In examples, the value (e.g., rgb value) of pixel 316 may be the same as or similar to the value of pixel 312. Accordingly, a backward flow B may be calculated by mapping pixel 316 to pixel 312. Similarly, a forward flow F may be calculated by mapping pixel 312 to pixel 320.

In instances of occlusion and/or where fast motion exists, correct optical flow calculations may be difficult to obtain because an incorrect pixel in a subsequent or previous image frame may be identified as corresponding to a pixel in a current frame. That is, identifying pixels in subsequent and/or previous image frames based on pixel values (e.g., rbg values for example) may lead to identifying an incorrect pixel having the same pixel value, but not corresponding to the pixel in the current image frame. That is, a flow at a location (x,y) may be invalid when a mapping from a reference image cannot be identified or when the calculated flow is inaccurate due to occlusion, fast motion, etc. A distance between the mapped location in the forward and backward flow maps may be used to determine if a flow at a location (x,y) is inaccurate due at least in part to an occlusion, fast motion, etc. The flow computed at location A is valid if $\|A-F_f(F_b(A))\|<\delta$, where $F_f$ and $F_b$ are forward and backward flow maps, respectively.

As an example, the optical flow validity mask may be generated by evaluating the distance between a pixel location of a first pixel in a first image frame and a corresponding mapped pixel location in the same image frame. That is, the first pixel at the first pixel location in the first image frame may be mapped to a pixel in a second frame using optical flow. The pixel in the second image frame may then be mapped back to the first image frame (e.g., to a pixel at a location in the first image frame). In instances where optical flow is correctly generated, the first pixel at the first location in the first image frame will be the same as the location of the mapped pixel in the first image frame. In instances where optical flow is incorrectly generated, a distance between the first pixel at the first location in the first image frame and the location of the mapped pixel in the first image frame may be different. Slight variations (e.g., less than a threshold value) may be acceptable; accordingly, if the distance between the pixel location and the mapped pixel location is less than a threshold value, the optical flow is considered to be correct and may be differentiated from those areas of optical flow that are considered to be incorrect (e.g., distance greater than the threshold value) utilizing the optical flow validity mask. For example, correct areas of optical flow may be equal to "1" in the optical flow validity mask while incorrect areas of optical flow may be equal to "0".

As depicted in FIG. 3, a distance 324 may be calculated between the pixel 316 and the pixel 320. If the distance is less than a threshold value, the optical flow for the pixel 316 may be indicated in an optical flow validity mask 336 as being accurate. Similarly, the optical flow for the pixel 312 may be indicated as accurate in the optical flow validity mask 336. In examples where the distance is greater than a threshold value, optical flow for the pixel 316 may be indicated as inaccurate in the optical flow validity mask 336. Similarly, the optical flow for the pixel 312 may be indicated as inaccurate in the optical flow validity mask 336.

In examples, the optical flow invalidity mask 328 may include the region 332 that is marked as being inaccurate. In addition, the optical flow validity mask 336 may include the region 340 that is marked as being inaccurate.

Figure 4:
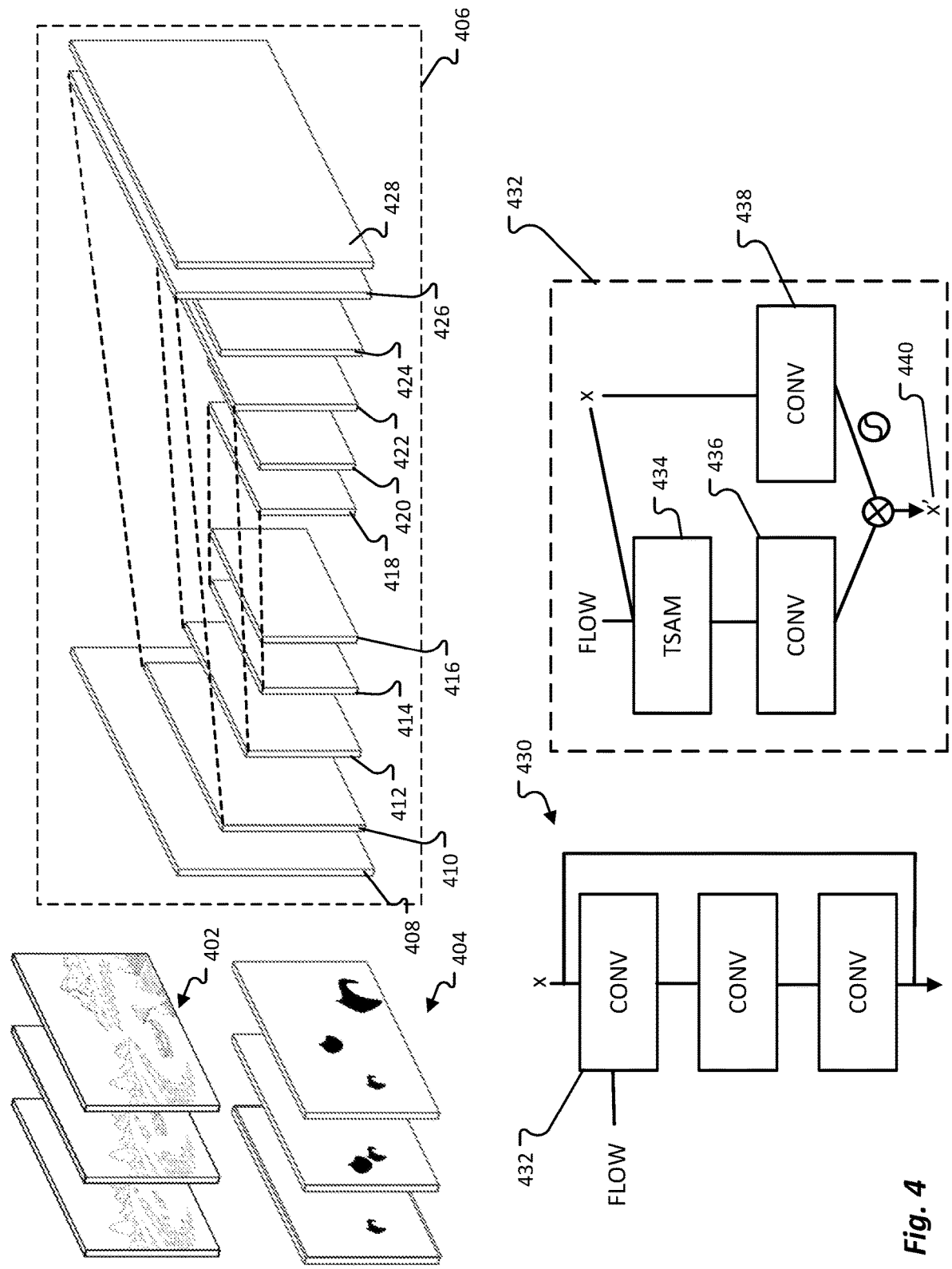
FIG. 4 depicts details of an example convolutional neural network encoder/decoder model in accordance with examples of the present disclosure.

FIG. 4 depicts an example CNN encoder/decoder 406 in accordance with examples of the present disclosure. The CNN encoder/decoder 406 may include multiple TSAM residual layers 408-416, deconvolutional layers 418, 422, and 426, and TSAM convolution and upsampling layers 420, 424, and 428. In examples, each bottleneck block structure 430 in the encoding stage of a convolutional neural network encoder/decoder may include a TSAM module 434. The TSAM module 434 may be included in the first layer 432 of the bottleneck block structure 430. Accordingly, the TSAM module 434, and therefore the bottleneck block structure 430, may take as input the previously generated optical flow and intermediate image features x. The TSAM module 434 aligns image features in neighboring frames using optical flow. The convolution layer 438 computes a gate denoting which kind of pixels to emphasize and/or suppress. An output of the TSAM module 434 may be provided to the convolution layer 436, an output of which may be multiplied by the gate provided by the convolution layer 438 to generate an output of the layer x'.

The first layer 432 of the bottleneck block structure 430 may be included in each of the TSAM residual layers 408-416 and the TSAM convolution and upsampling layers 420, 424, 428 to align image features from neighboring image frames. For example, the TSAM module 434 may shift features from neighboring frames using optical flow. Additional details of the flow warp operation that shifts image features from neighboring frames are described with respect to FIGS. 5A and 5C. The CNN encoder/decoder 406 may take as input, the sequence of images 402 together with the sequence of pixel mask images 404 and generate a completed output sequence of images where the corrupted and/or missing pixel information is filled in with plausible content.

Figure 5A:
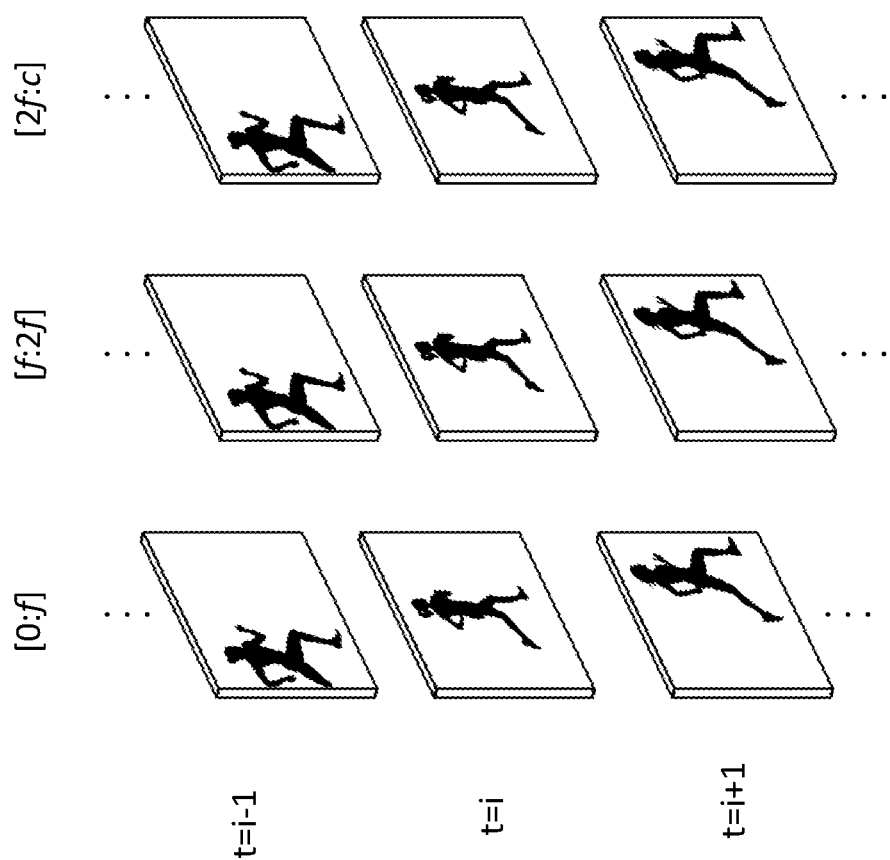
FIGS. 5A-5C describe details related to a flow warp operation in accordance with examples of the present disclosure.
Figure 5B:
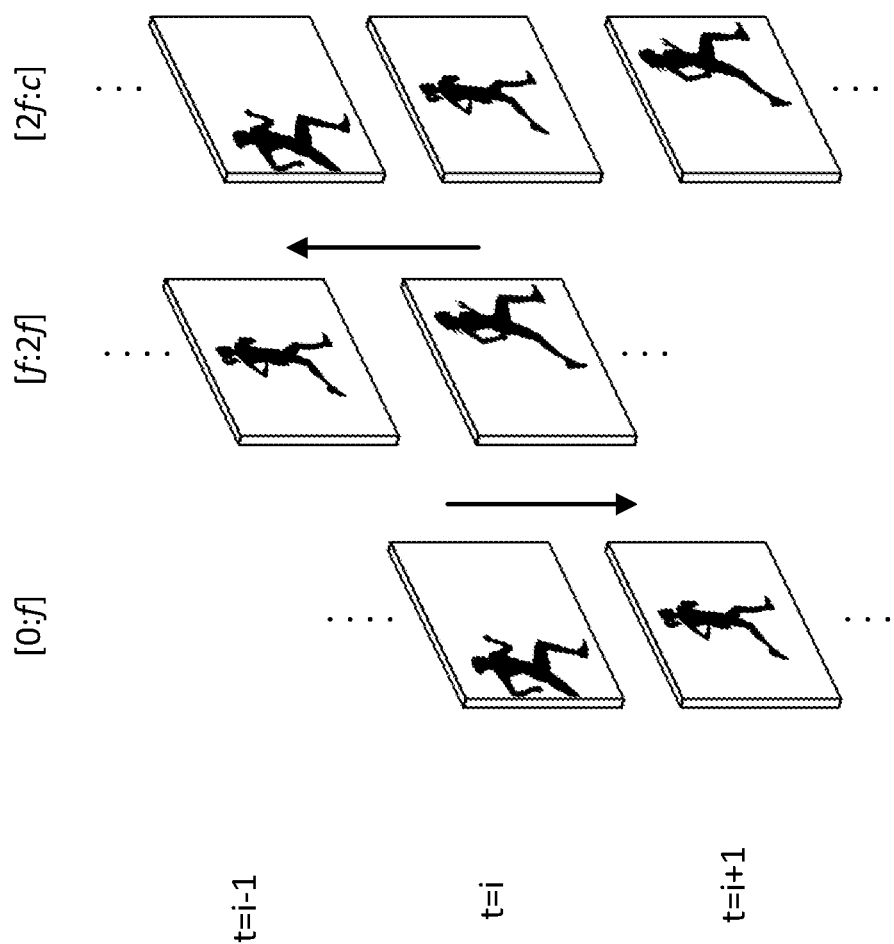
Figure 5C:
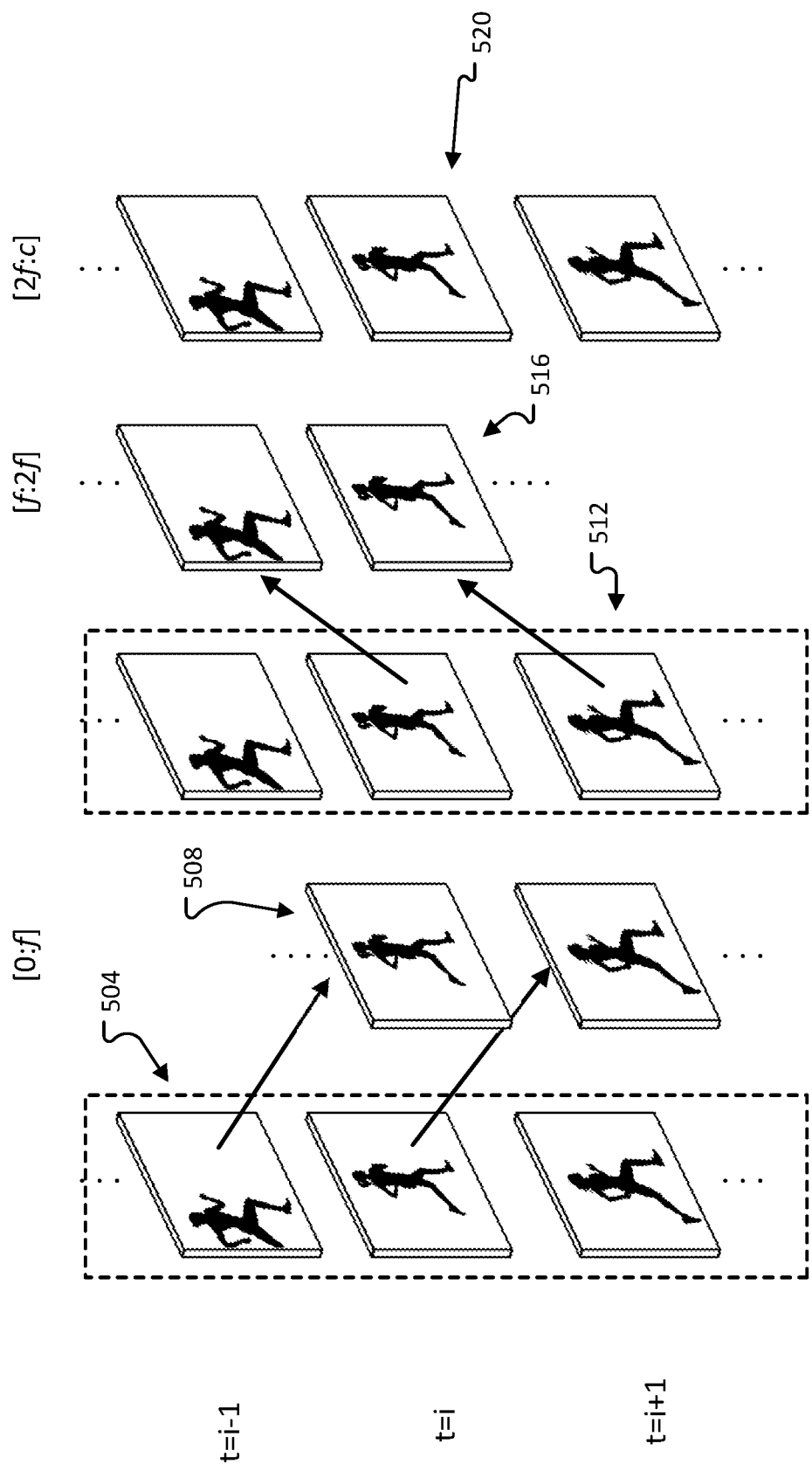

FIGS. 5A-5C describe details related to the flow warp operation that shifts features between neighboring frames in accordance with examples of the present disclosure. As depicted in FIG. 5A, original image features include three image feature maps at three different timestamps split into three channel groups. Of course, more or less image feature maps and channel groups may be contemplated. An example of a channel may include color channels. For example, a red channel, green channel, and blue channel may exist for each image in an image sequence. FIG. 5B depicts a feature shifting operation. More specifically, the channels with index [0:f] are shifted downward and the channels with index [f:2f] are shifted upward so that the feature map at t=i will include features from t=i+1 and t=i−1. However, while such temporal information may be efficiently aggregated, the aggregated temporal features are not spatially aligned. For example, the positions of the person are at different locations in different frames due to object motion. Accordingly, the aggregated features will be misaligned with regard to the image content causing potential blurring to occur at regions of inpainting.

In accordance with examples of the present disclosure, the TSAM module 434 may shift the warped features between neighboring frames, warp the shifted features to correction spatial alignment at a current timestamp using optical flow, and then aggregate the aligned features with the original features using the optical flow validity mask. As pixel level optical flow has different sizes of feature maps, the original optical flow to feature size may be interpolated using a nearest neighbor approach. In some examples, the magnitude may be scaled by a ratio of original flow size divided by the feature size. Additional details of the flow warp process are provided with respect to FIG. 5C.

As depicted in 5C, image features are shifted between neighboring frames. More specifically, the features at the first f channels (e.g., [0:f]) are shifted downwards and the next f channels (e.g., [f:2f]) are shifted upwards. The remaining features remain unchanged. The flow warp operation further includes warping the shifted features to its current timestamp using reverse flow. As an example, the temporally shifted features of image feature map 504 are warped to obtain the temporally shifted and spatially aligned image feature map 508. The temporally shifted and spatially aligned image feature map 508 includes information from t=i−1. Similarly, the temporally shifted features of image feature map 512 are warped to obtain the temporally shifted and spatially aligned image feature map 516. The temporally shifted and spatially aligned image feature map 516 includes information from t=i+1. Accordingly, image feature map 504, 516, and 520 may be aggregated and the optical flow validity mask may be applied. For example, given warped features $f_t^w$ and original features $f_t$ from corresponding channels, the final shift-and-aligned features $\hat{f}_t^w$ using the optical flow validity mask may be generated as follows: $\hat{f}_t^w = v f_t^w + (1-v) f_t$, where v is the binary optical flow validity mask having a value of 1 at valid pixels and 0 otherwise, and $f_t^w$ are the warped features. The resulting feature maps may be concatenated along the channel dimension and passed for further computation. To maintain temporal and spatial alignment between image feature maps, the TSAM module 434 may be included in every bottleneck block structure in the encoding stage of the network and also included in the convolution layers in the decoding stage.

The images output by the CNN encoder/decoder 406 of FIG. 4 may be provided to a temporal patch generative adversarial network (GAN) discriminator 232 of FIG. 2, to enforce spatial temporal features following the ground truth target distribution. The temporal patch GAN discriminator may focus on different spatial-temporal features to improve the output video quality. In examples, the temporal patch GAN may include multiple 3D convolutional layers.

The real-world application of video inpainting includes corrupted video restoration, object removal, watermark removal etc. To mimic these applications, the CNN encoder/decoder 406 of FIG. 4 may be trained and evaluated based on different types of masks, including but not limited to moving object-like masks, moving curve masks, and stationary masks. The object-like masks and the curve masks may include moving masks that occupy 0-10% to 60%-70% of the overall frame area and may move in both evaluation and training stages. The stationary mask is static in evaluation but may move during training for data augmentation.

The CNN encoder/decoder 406 of FIG. 4 may be trained in a variety of manners including being trained in multiple stages and/or fine-tuning a pre-trained CNN encoder/decoder that was pre-trained utilizing a different data set. For example, in a first stage, the CNN encoder/decoder 406 of FIG. 4 is trained utilizing image reconstruction loss, perceptual loss and style loss. During the second stage, the CNN encoder/decoder 406 of FIG. 4 may then be further fine-tuned by including image reconstruction loss in the corrupted regions and temporal patch GAN loss in the loss function. Fine-tuning a pre-trained CNN encoder/decoder may incorporate reconstruction loss, style loss, perceptual loss, and temporal patch GAN loss.

The loss functions may include four parts: (1) a reconstruction loss $L_r$, (2) a perceptual loss $L_p$, (3) a style loss $L_s$, and (40) a temporal patch GAN loss $L_G$. Accordingly, the total loss may be detailed as $L_{total} = L_r + \lambda_p L_p + \lambda_s L_s + \lambda_G L_G$, where $\lambda_p + \lambda_s + \lambda_G$ are coefficients for loss terms. Reconstruction loss includes two parts: an L1 loss to constrain the overall reconstruction of the image and another L1 loss to focus on the pixel accuracy of the corrupted region. Perceptual loss is widely used in video inpainting or image inpainting tasks to improve visual quality of generated images. Perceptual loss may be accumulated over all frames in an output video sequence. Style loss is also widely applied in image/video inpainting tasks and is accumulated over all frames between the output video sequence and the ground truth video.

Figure 6:
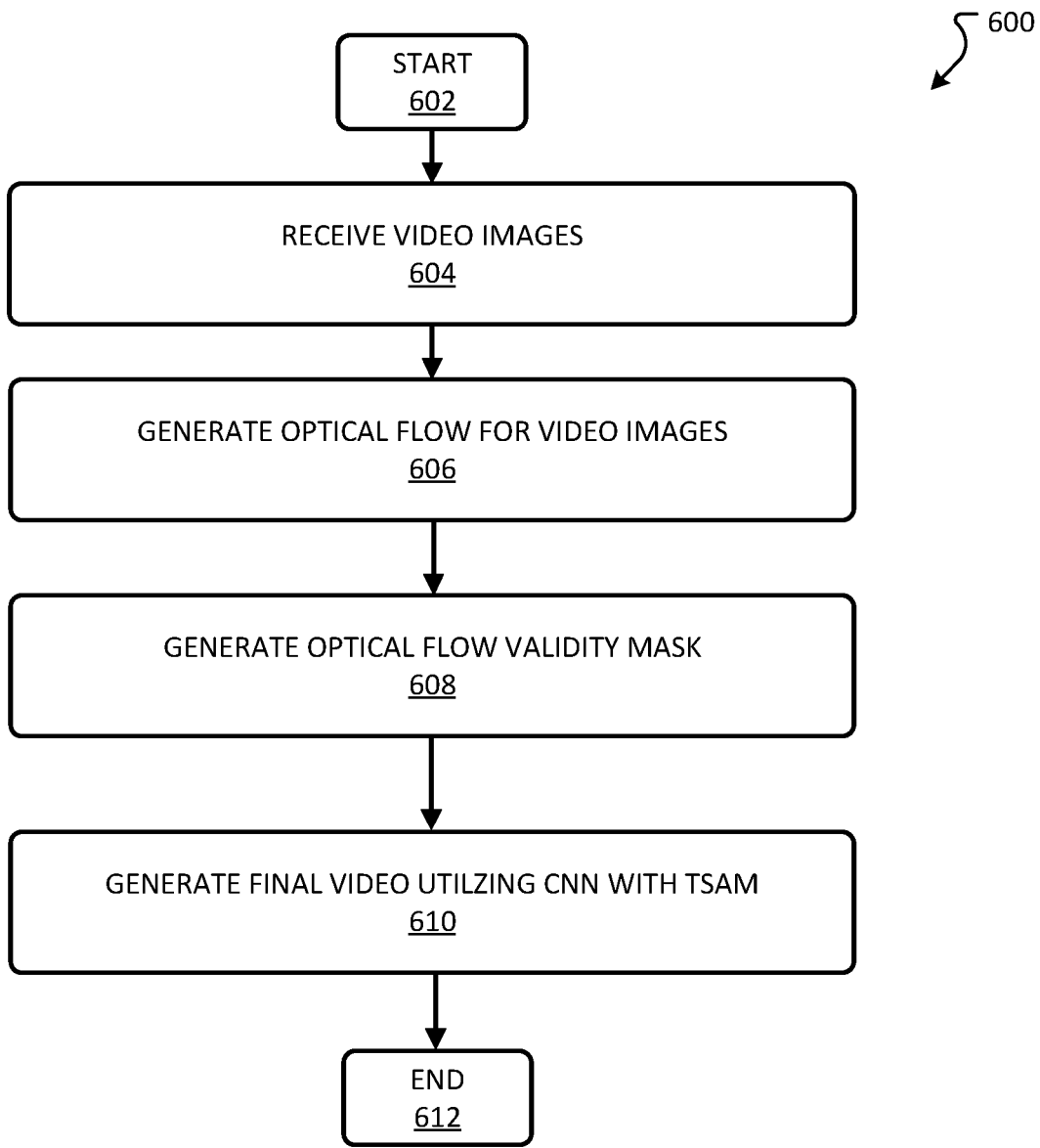
FIG. 6 depicts details of a method for inpainting video in accordance with examples of the present disclosure.

FIG. 6 depicts details of a method 600 for inpainting video in accordance with examples of the present disclosure. A general order for the steps of the method 600 is shown in FIG. 6. Generally, the method 600 starts at 602 and ends at 612. The method 600 may include more or fewer steps or may arrange the order of the steps differently than those shown in FIG. 6. The method 600 can be executed as a set of computer-executable instructions executed by a computer system and encoded or stored on a computer readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method starts at 602, where flow may proceed to 604. At 604, video images may be received. For example, a sequence of images 106 (FIG. 1) and a sequence of pixel mask images 110 (FIG. 1) may be received at a video acquisition manager 222 (FIG. 2). The method 600 may then proceed to 606 where optical flow based on the received sequence of images 106 may be generated. For example, as shown in FIG. 2, the optical flow generator 224 may generate forward and backward optical flow fields for use by an optical flow validity mask generator 226 and the CNN encoder/decoder 228. Optical flow is a per pixel prediction used to estimate how the pixel's brightness moves across an image over time. Optical flow assumes that I(x, y, t)=I(x+Δx, y+Δy, t+Δt); that is, the pixel characteristic at time t (i.e. rgb values) is the same as the pixel characteristics at t=t+Δt but at a different location (denoted by Δx and Δy), where the change in location is what is predicted by the flow field. In examples, optical flow may be generated in the forward direction (e.g., a displacement vector based on a current image frame at t=t and subsequent image frame at t=t+Δt) and the backward direction (e.g., a displacement vector based on a current image frame at t=t and previous image frame at t=t−Δt).

The method 600 may then proceed to 608, where an optical flow validity mask may be generated by an optical flow validity mask generator 226 (FIG. 2) for example. The optical flow validity mask may be generated by evaluating the distance between a pixel location of a first pixel in a first image frame and a corresponding optical flow mapped pixel location in the first image frame. For example, correct areas of optical flow may be equal to "1" in the optical flow validity mask while incorrect areas of optical flow may be equal to "0".

The method may proceed to 610, where once the optical flows and corresponding optical flow validity masks have been generated, the optical flows and corresponding optical flow validity masks are provided to the TSAM module in bottleneck block structures in the encoding stage of a convolutional neural network encoder/decoder module. The TSAM module may shift the image features of neighbor frames and then warp the shifted image features to the correct spatial location at the current shifted time stamp using optical flow. The CNN with the TSAM module may then generate a final complete video at 610. The method 600 may end at 612.

Figure 7:
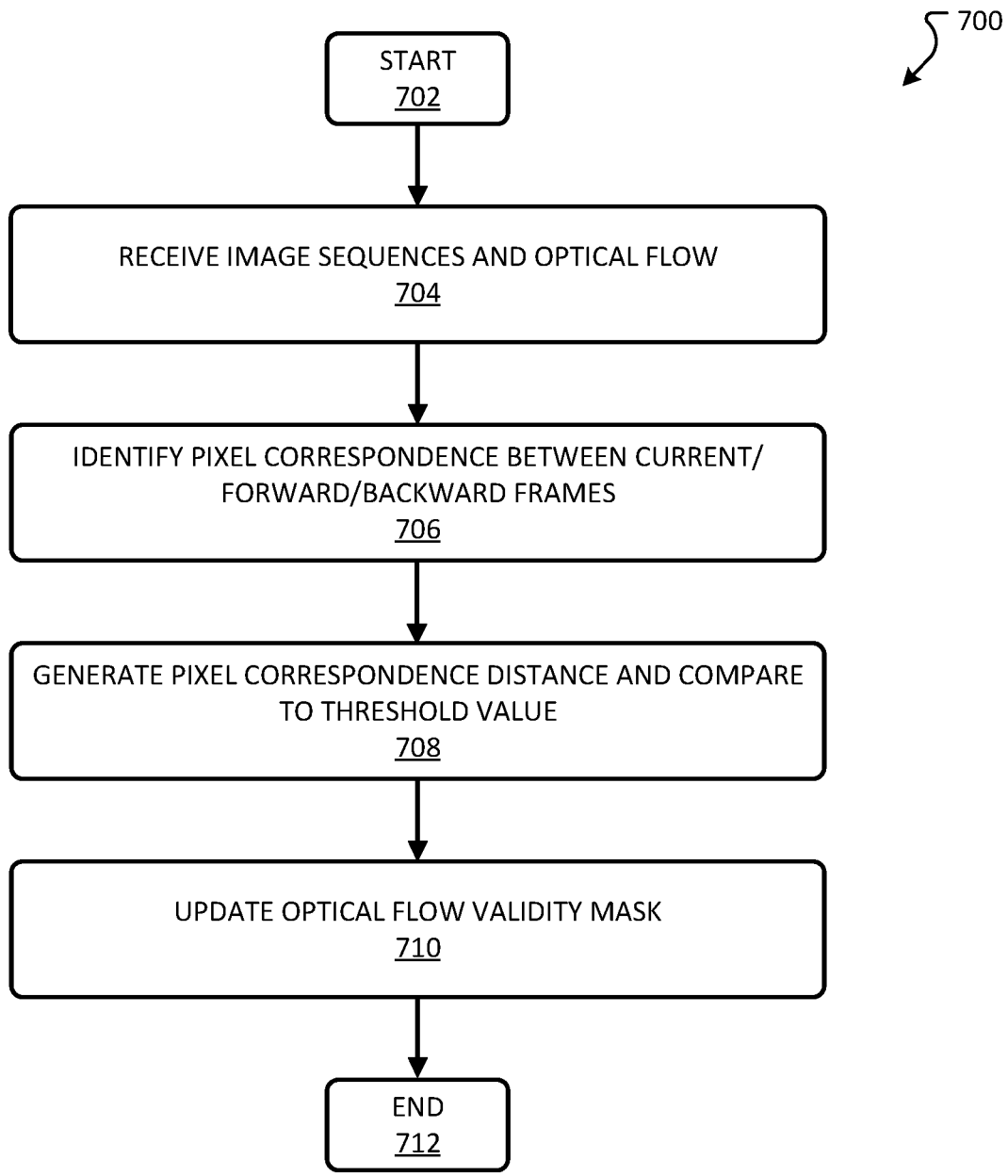
FIG. 7 depicts details of a method for generating an optical flow validity mask in accordance with examples of the present disclosure.

FIG. 7 depicts details of a method 700 for generating an optical flow validity mask in accordance with examples of the present disclosure. A general order for the steps of the method 700 is shown in FIG. 7. Generally, the method 700 starts at 702 and ends at 712. The method 700 may include more or fewer steps or may arrange the order of the steps differently than those shown in FIG. 7. The method 700 can be executed as a set of computer-executable instructions executed by a computer system and encoded or stored on a computer readable medium. In examples, aspects of the method 700 are performed by one or more processing devices, such as a computer or server. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method starts at 702, where flow may proceed to 704. At 704, a sequence of images, such as sequence of images 106 (FIG. 1), and the corresponding optical flow for the sequence of images may be received at an optical flow validity mask generator 226 (FIG. 2) for example. In instances of occlusion and/or where fast motion exists, correct optical flow calculations may be difficult to obtain because an incorrect pixel in a subsequent or previous image frame may be identified as corresponding to a pixel in a current frame. That is, identifying pixels in subsequent and/or previous image frames based on pixel values (e.g., rbg values for example) may lead to identifying an incorrect pixel having the same pixel value, but not corresponding to the pixel in the current image frame. To identify regions in a sequence of images where optical flow calculations may not be as accurate as other regions, the optical flow validity mask may be used, and may be based on a distance between the mapped locations of a pixel using forward and backward flow maps. Thus, an optical flow at location A is valid if $\|A-F_f(F_b(A))\|<\delta$, where $F_f$ and $F_b$ are forward and backward flow maps, respectively.

The method may proceed to 706, where pixel correspondence between a current frame and a subsequent frame and between a current frame and a previous frame may be generated. As an example, a pixel at a first pixel location in a current image frame may be mapped to a pixel location in a second frame (e.g., previous or subsequent frame) using optical flow. The pixel value associated with the pixel location in the second image frame may then be mapped back to the first image frame (e.g., to a pixel at a location in the first image frame). In instances where optical flow is correctly generated, the first pixel at the first location in the first image frame will be the same as the location of the mapped pixel in the first image frame. In instances where optical flow is incorrectly generated, a distance between the first pixel at the first location in the first image frame and the location of the mapped pixel in the first image frame may be different.

The method 700 may proceed to 708, where a distance between the pixel location and the mapped pixel location may be generated and compared to a threshold value; if the distance is greater than a threshold value, the optical flow may be considered incorrect and may be differentiated from those areas of optical flow that are considered to be correct (e.g., distance less than the threshold value) by updating the optical flow validity mask at 710. For example, correct areas of optical flow may be equal to "1" in the optical flow validity mask while incorrect areas of optical flow may be equal to "0". The optical flow validity mask may be updated at 710 to reflect correct areas of optical flow and incorrect areas of optical flow. In examples, the optical flow validity mask may start with all pixel positions equal to "1" and only update those pixel positions determined to be associated with incorrect flow. The method 700 may end at 712.

Figure 8:
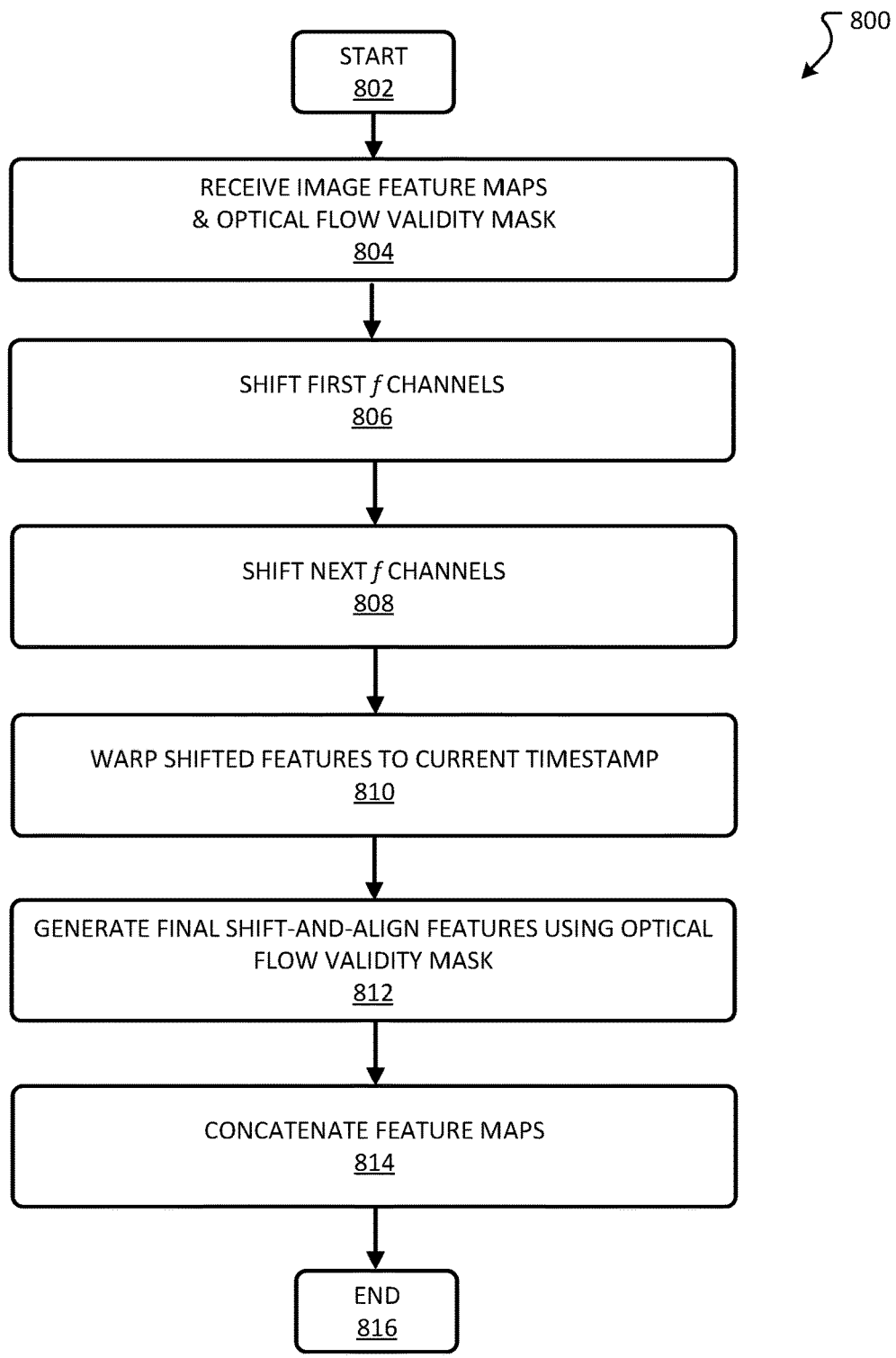
FIG. 8 depicts details of a method for performing a temporal shift and spatial alignment of image feature maps in accordance with examples of the present disclosure.

FIG. 8 depicts details of a method 800 for performing a temporal shift and spatial alignment of image feature maps in accordance with examples of the present disclosure. A general order for the steps of the method 800 is shown in FIG. 8. Generally, the method 800 starts at 802 and ends at 816. The method 800 may include more or fewer steps or may arrange the order of the steps differently than those shown in FIG. 8. The method 800 can be executed as a set of computer-executable instructions executed by a computer system and encoded or stored on a computer readable medium. In examples, aspects of the method 800 are performed by one or more processing devices, such as a computer or server, and/or in conjunction with a TSAM module 434 for example. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method starts at 802, where flow may proceed to 804. At 804, image feature maps, from previous CNN layers for example, may be received together with the optical flow validity mask. The method may proceed to 806, where the features at the first f channels (e.g., [0:f]) are shifted downwards. For example, a frame associated with a time t=i−1 is shifted down one time step. The method 800 may proceed to 808, where the next f channels (e.g., [f:2f]) are shifted upwards. For example, a frame associated with a time t=i+1 is shifted up one time step.

The method may proceed 810, where the shifted image feature maps are warped to a current timestamp. For example, the flow warp operation includes warping the shifted features to its current timestamp using reverse flow. As an example with respect to FIG. 5C, the temporally shifted features of image feature map 504 are warped to obtain the temporally shifted and spatially aligned image feature map 508. The temporally shifted and spatially aligned image feature map 508 includes information from t=i−1. Similarly, the temporally shifted features of image feature map 512 are warped to obtain the temporally shifted and spatially aligned image feature map 516. The temporally shifted and spatially aligned image feature map 516 includes information from t=i+1.

The method 800 may proceed to 812, wherein a final image feature map is obtained by aggregating temporally shifted and spatially aligned image feature maps and applying the optical flow validity mask. For example, given warped features $f_t^w$ and original features $f_t$ from corresponding channels, the final shift-and-aligned features $\tilde{f}_t^w$ using the optical flow validity mask may be generated as follows: $\tilde{f}_t^w = v f_t^w + 1\,(1-v)\,f_t$, where v is the binary optical flow validity mask having a value of 1 at valid pixels and 0 otherwise, and $f_t^w$ are the warped features. The resulting feature maps may be concatenated at 814 along the channel dimension and passed for further computation. The method 800 may end at 816.

Figure 9:
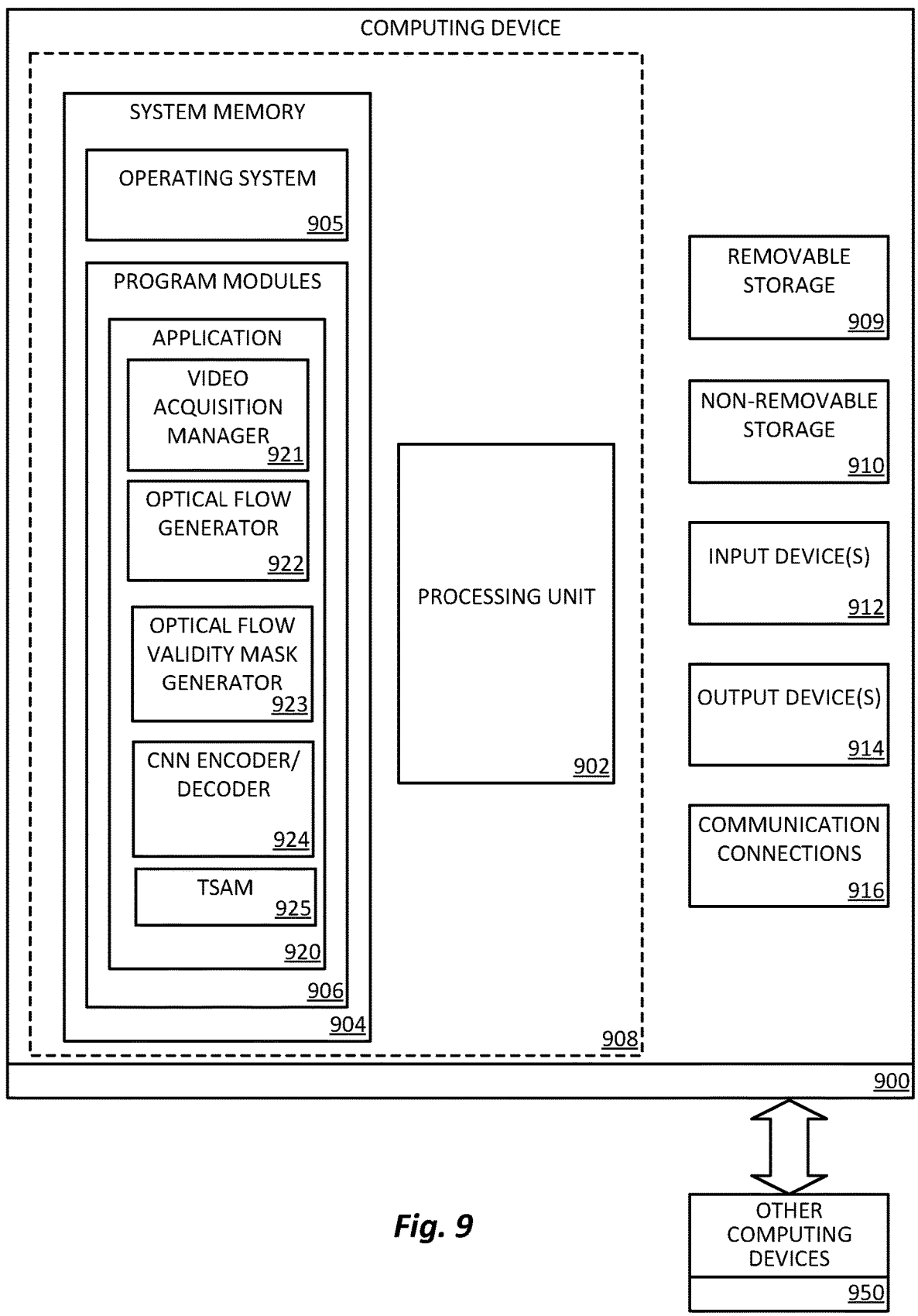
FIG. 9 is a block diagram illustrating physical components (e.g., hardware) of a computing device with which aspects of the disclosure may be practiced.
Figure 10A:
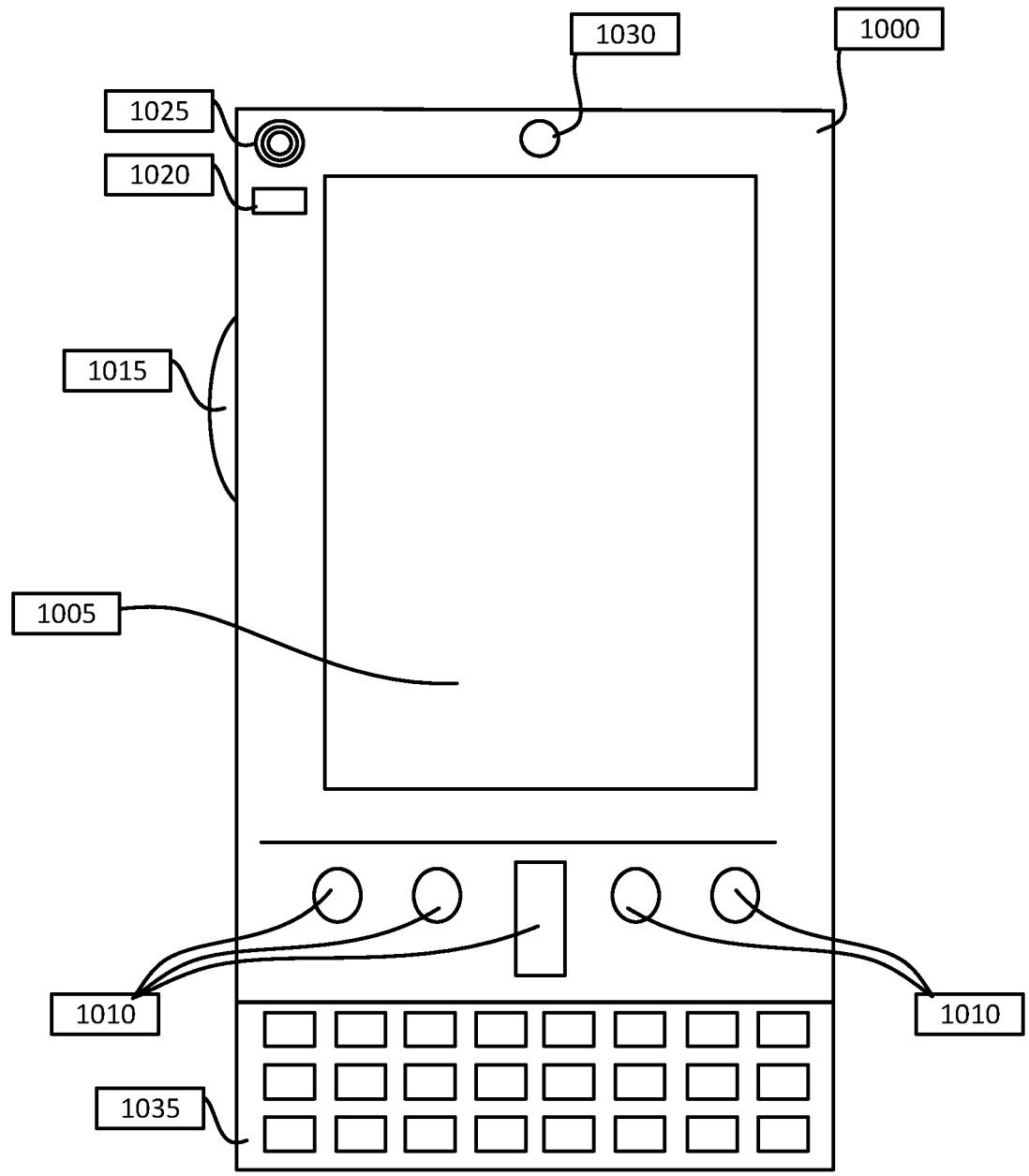
FIGS. 10A-10B illustrate a mobile computing device with which embodiments of the disclosure may be practiced.
Figure 10B:
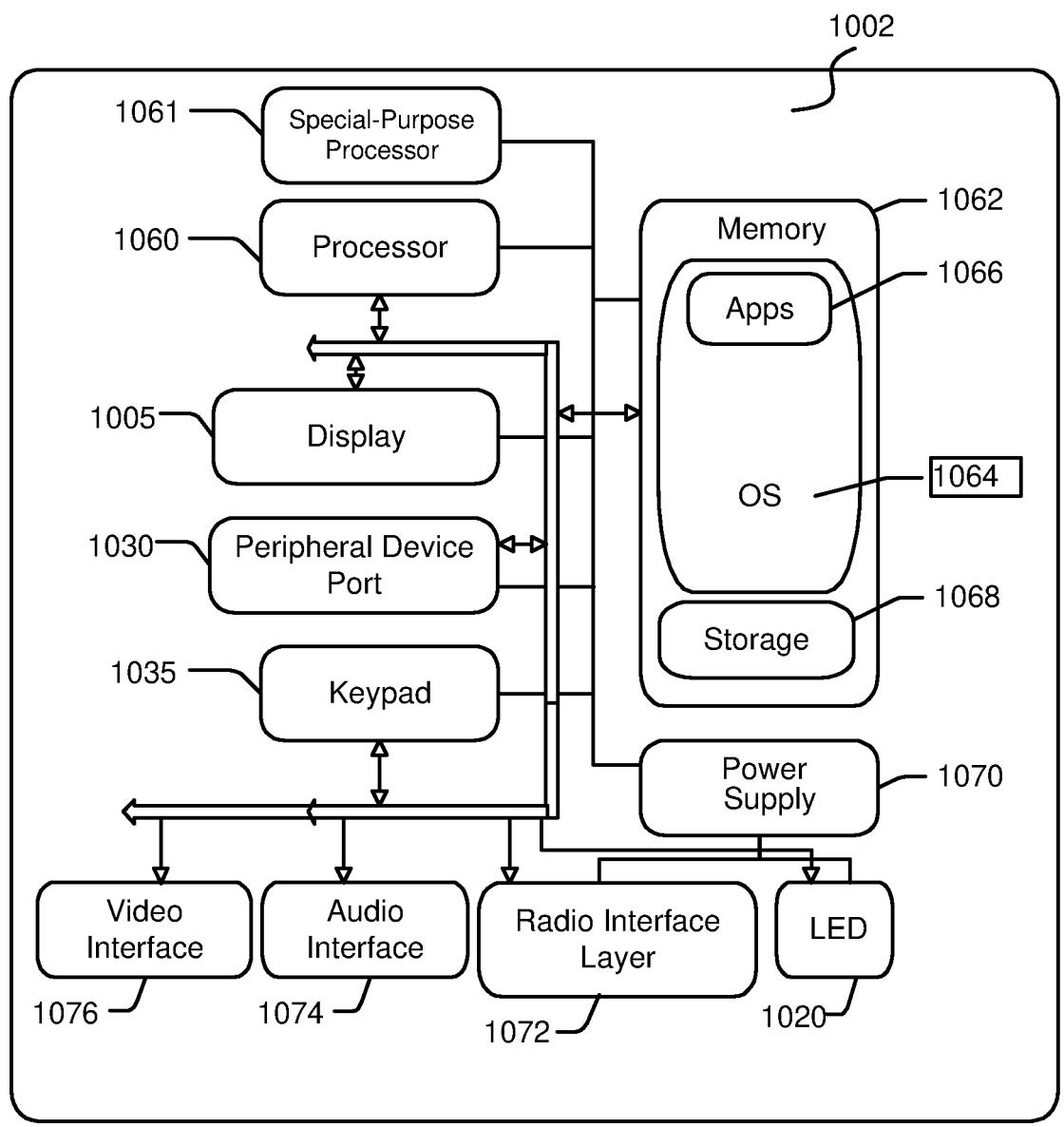
Figure 11:
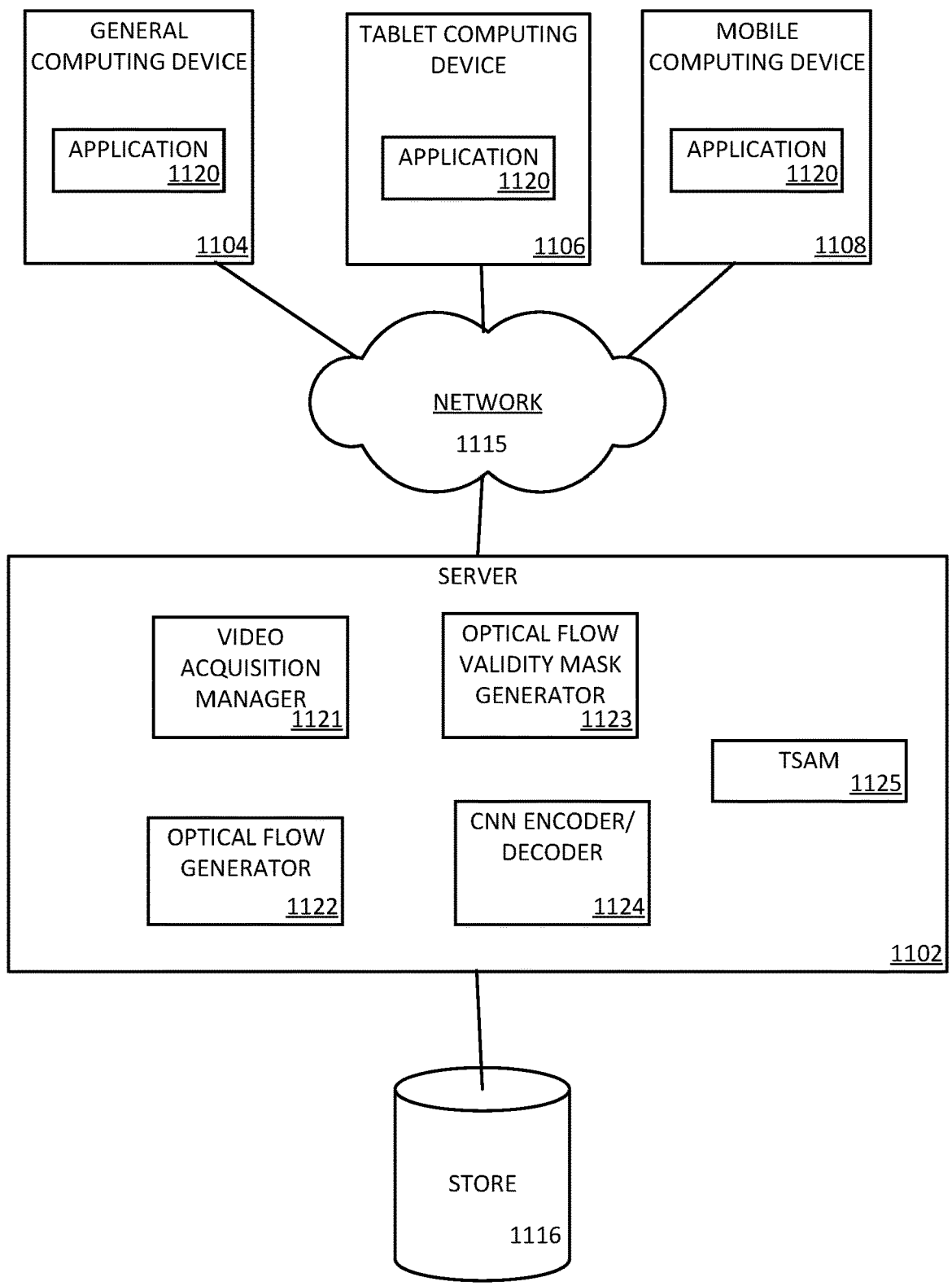
FIG. 11 illustrates one aspect of the architecture of a system for processing data.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, described herein.

FIG. 9 is a block diagram illustrating physical components (e.g., hardware) of a computing system 900 with which aspects of the disclosure may be practiced. The computing device components described below may be suitable for the computing and/or processing devices described above. In a basic configuration, the computing system 900 may include at least one processing unit 902 and a system memory 904. Depending on the configuration and type of computing device, the system memory 904 may comprise, but is not limited to, volatile storage (e.g., random-access memory (RAM)), non-volatile storage (e.g., read-only memory (ROM)), flash memory, or any combination of such memories.

The system memory 904 may include an operating system 905 and one or more program modules 906 suitable for running software application 920, such as one or more components supported by the systems described herein. As examples, system memory 904 may include the video acquisition manager 921, the optical flow generator 922, the optical flow validity mask generator 923, the CNN encoder/decoder 924, and the TSAM 925. The video acquisition manager 921 may be the same as or similar to the video acquisition manager 222 previously described. The optical flow generator 922 may be the same as or similar to the optical flow generator 224 previously described. The optical flow validity mask generator 923 may be the same as or similar to the optical flow validity mask generator 226 previously described. The CNN encoder/decoder 924 may be same as or similar to the CNN encoder/decoder 228 previously described. The TSAM 925 may be the same as or similar to the TSAM module 230 previously described. The operating system 905, for example, may be suitable for controlling the operation of the computing system 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing system 900 may have additional features or functionality. For example, the computing system 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., software applications 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 900 may also have one or more input device(s) 912 such as a keyboard, a mouse, a pen, a sound or voice input device, a touch or swipe input device, etc. The one or more input device 912 may include an image sensor. The output device(s) 914 such as a display, speakers, a printer, etc. may also be included. The aforementioned devices are examples and others may be used. The computing system 900 may include one or more communication connections 916 allowing communications with other computing devices/systems 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 900. Any such computer storage media may be part of the computing system 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A-10B illustrate a mobile computing device 1000, for example, a mobile telephone, a smart phone, wearable computer (such as a smart watch), a tablet computer, a laptop computer, and the like, with which embodiments of the disclosure may be practiced. In some examples, the mobile computing device 1000 may be the same as or similar to the computing device 104. In some examples, the mobile computing device 1000 may be the same as or similar to the inpainting video server 202. In some respects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

If included, an optional side input element 1015 allows further user input. The side input element 1015 may be a rotary switch, a button, or any other type of manual input element. In alternative aspects, mobile computing device 1000 may incorporate greater or fewer input elements. For example, the display 1005 may not be a touch screen in some embodiments.

In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, maps programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an onboard camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 3068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, tablet computing device 1106, or mobile computing device 1108, as described above. The personal computer 1104, tablet computing device 1106, or mobile computing device 1108 may include one or more applications 1120; such applications may include but is not limited to the adaptive content display system, the communication application, the graphical user interface generator, and the image post-processor as previously described. Content at a server device 1102 may be stored in different communication channels or other storage types. For example, various documents may be stored using a directory service, a web portal, a video inpainting service, an instant messaging store, or social networking services.

One or more of the previously described program modules 906 or software applications 920 may be employed by server device 1102 and/or the personal computer 1104, tablet computing device 1106, or mobile computing device 1108, as described above. For example, the server device 1102 may include the video acquisition manager 1121, the optical flow generator 1122, the optical flow validity mask generator 1123, the CNN encoder/decoder 1124, and the TSAM 1125. The video acquisition manager 1121 may be the same as or similar to the video acquisition manager 222 previously described. The optical flow generator 1122 may be the same as or similar to the optical flow generator 224 previously described. The optical flow validity mask generator 1123 may be the same as or similar to the optical flow validity mask generator 226 previously described. The CNN encoder/decoder 1124 may be same as or similar to the CNN encoder/decoder 228 previously described. The TSAM 1125 may be the same as or similar to the TSAM module 230 previously described.

The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for inpainting a sequence of initial image frames according to at least the examples provided in the sections below:

(A1) In one aspect, some examples include a method for inpainting a sequence of initial image frames. The method may include receiving initial video data representing a sequence of initial image frames, generating optical flow displacement values between neighboring image frames of the sequence of initial image frames, warp-shifting image features from image feature maps of one or more neighboring image frames to image feature maps of a current image frame using the optical flow displacement values, and generating a sequence of complete image frames based on warp-shifted image features from the feature maps of the one or more neighboring image frames and image features from the image feature maps of the current image frame, the sequence of complete image frames including an inpainted version of the sequence of initial image frames.

(A2) In some examples of A1, the method includes generating optical flow validity masks for respective image frames of the sequence of image frames based on the optical flow displacement values, and selecting warp-shifted image features from the feature maps of the one or more neighboring image frames and image features from the image feature maps of the current image frame based on one or more of the optical flow validity masks, wherein the sequence of complete image frames is based on the selected warp-shifted image features from the feature maps of the one or more neighboring image frames and the selected image features from the image feature maps of the current image frame.

(A3) In some examples of A1-A2, the method includes warp-shifting image features from image feature maps of one or more neighboring image frames to image feature maps of a current image frame includes: temporally shifting features from a first image feature map in a first channel of a previous image frame to the current image frame, temporally shifting features from a second image feature map in a second channel of a subsequent image frame to the current image frame, warping the shifted image features from the first image feature map in the first channel to a time consistent with the current image frame, and warping the shifted image features from the first image feature map in the first channel to a time consistent with the current image frame.

(A4) In some examples of A1-A3, generating optical flow validity masks for respective image frames of the sequence of image frames based on the optical flow displacement values includes: mapping a first pixel location in a first image frame to a pixel location in a second image frame using a backward optical flow displacement value, mapping the pixel location in the second image frame to a second pixel location in the first image frame using a forward optical flow displacement value, and determining a distance between the first pixel location in the first image frame and the second pixel location in the first image frame.

(A5) In some examples of A1-A4, the method includes indicating that optical flow displacement values associated with the first pixel location in the first image frame are valid when the determined distance between the first pixel location in the first image frame and the second pixel location in the first image frame is less than a threshold distance value.

(A6) In some examples of A1-A5, the method includes providing the optical flow displacement values and the optical flow validity mask to a trained convolutional neural network model including a plurality of encoding layers and a plurality of decoding layers, and at one or more encoding layers of the plurality of encoding layers and one or more decoding layers of the plurality of decoding layers: warp-shifting image features from an image feature map of a first channel of a first neighboring image frame to the image feature maps of the current image frame using the optical flow displacement value, warp-shifting image features from an image feature map of a second channel of a second neighboring image frame to the image feature maps of the current image frame using the optical flow displacement value, and concatenating the feature maps along the channel dimension.

(A7) In some examples of A1-A6, the method includes applying a convolution operation to the concatenated feature maps, and combining the results of the convolution operation applied to the concatenated feature maps with a gating signal.

In yet another aspect, some examples include a computing system including one or more processors and memory coupled to the one or more processors, the memory storing instructions configured to be executed by the one or more processors, the instructions when executed by the on or more processors, perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

(B1) In one aspect, some examples include a system configured to perform video inpainting. The system may include a processor, and memory including instructions, which when executed by the processor, causes the processor to: receive initial video data representing a sequence of initial image frames, generate optical flow displacement values between neighboring image frames of the sequence of initial image frames, at one or more encoding layers and at one or more decoding layers of a trained convolutional neural network, warp-shift image features from image feature maps of one or more neighboring image frames to image feature maps of a current image frame using the optical flow displacement values, and generate a sequence of complete image frames based on warp-shifted image features from the feature maps of the one or more neighboring image frames and image features from the image feature maps of the current image frame, the sequence of complete image frames including an inpainted version of the sequence of initial image frames.

(B2) In some examples of B1, the instructions, when executed by the processor, cause the processor to: generate optical flow validity masks for respective image frames of the sequence of image frames based on the optical flow displacement values, and select warp-shifted image features from the feature maps of the one or more neighboring image frames and image features from the image feature maps of the current image frame based on one or more of the optical flow validity masks, wherein the sequence of complete image frames is based on the selected warp-shifted image features from the feature maps of the one or more neighboring image frames and the selected image features from the image feature maps of the current image frame.

(B3) In some examples of B1-B2, the instructions, when executed by the processor, cause the processor to: temporally shift features from a first image feature map in a first channel of a previous image frame to the current image frame, temporally shift features from a second image feature map in a second channel of a subsequent image frame to the current image frame, warp the shifted image features from the first image feature map in the first channel to a time consistent with the current image frame, and warp the shifted image features from the first image feature map in the first channel to a time consistent with the current image frame.

(B4) In some examples of B1-B3, the instructions, when executed by the processor, cause the processor to: map a first pixel location in a first image frame to a pixel location in a second image frame using a backward optical flow displacement value, map the pixel location in the second image frame to a second pixel location in the first image frame using a forward optical flow displacement value, and determine a distance between the first pixel location in the first image frame and the second pixel location in the first image frame.

(B5) In some examples of B1-B4, the instructions, when executed by the processor, cause the processor to indicate that optical flow displacement values associated with the first pixel location in the first image frame are valid when the determined distance between the first pixel location in the first image frame and the second pixel location in the first image frame is less than a threshold distance value.

(B6) In some examples of B1-B5, the instructions, when executed by the processor, cause the processor to provide the optical flow displacement values and the optical flow validity mask to the trained convolutional neural network, and at one or more encoding layers of the plurality of encoding layers and one or more decoding layers of the plurality of decoding layers: warp-shift image features from an image feature map of a first channel of a first neighboring image frame to the image feature maps of the current image frame using the optical flow displacement value, warp-shift image features from an image feature map of a second channel of a second neighboring image frame to the image feature maps of the current image frame using the optical flow displacement value, and concatenate the feature maps along the channel dimension.

(B7) In some examples of B1-B6, the instructions, when executed by the processor, cause the processor to: apply a convolution operation to the concatenated feature maps, and combine the results of the convolution operation applied to the concatenated feature maps with a gating signal.

(B8) In some examples of B1-B7, the instructions, when executed by the processor, cause the processor to provide the sequence of complete image frames to a computing system.

(C1) In one aspect, some examples include a method for inpainting a sequence of initial image frames. The method may include receiving initial video data representing a sequence of initial image frames, generating optical flow displacement values between neighboring image frames of the sequence of initial image frames, generating optical flow validity masks for respective image frames of the sequence of image frames based on the optical flow displacement values, warp-shifting image features from image feature maps of one or more neighboring image frames to image feature maps of a current image frame using the optical flow displacement values, selecting warp-shifted image features from the feature maps of the one or more neighboring image frames and image features from the image feature maps of the current image frame based on one or more of the optical flow validity masks, and generating a sequence of complete image frames based on the selected warp-shifted image features from the feature maps of the one or more neighboring image frames and the selected image features from the image feature maps of the current image frame, the sequence of complete image frames including an inpainted version of the sequence of initial image frames.

(C2) In some examples of C1, warp-shifting image features from image feature maps of one or more neighboring image frames to image feature maps of a current image frame includes: temporally shifting features from a first image feature map in a first channel of a previous image frame to the current image frame, temporally shifting features from a second image feature map in a second channel of a subsequent image frame to the current image frame, warping the shifted image features from the first image feature map in the first channel to a time consistent with the current image frame, and warping the shifted image features from the first image feature map in the first channel to a time consistent with the current image frame.

(C3) In some examples of C1-C2, generating optical flow validity masks for respective image frames of the sequence of image frames based on the optical flow displacement values includes: mapping a first pixel location in a first image frame to a pixel location in a second image frame using a backward optical flow displacement value, mapping the pixel location in the second image frame to a second pixel location in the first image frame using a forward optical flow displacement value, and determining a distance between the first pixel location in the first image frame and the second pixel location in the first image frame.

(C4) In some examples of C1-C3, the method includes indicating that optical flow displacement values associated with the first pixel location in the first image frame are valid when the determined distance between the first pixel location in the first image frame and the second pixel location in the first image frame is less than a threshold distance value.

(C5) In some examples of C1-C4, the method includes providing the optical flow displacement values and the optical flow validity mask to a trained convolutional neural network model including a plurality of encoding layers and a plurality of decoding layers, warp-shifting image features from an image feature map of a first channel of a first neighboring image frame to the image feature maps of the current image frame using the optical flow displacement value at one or more encoding layers of the plurality of encoding layers and one or more decoding layers of the plurality of decoding layers, warp-shifting image features from an image feature map of a second channel of a second neighboring image frame to the image feature maps of the current image frame using the optical flow displacement value at one or more encoding layers of the plurality of encoding layers and one or more decoding layers of the plurality of decoding layers, and concatenating the feature maps along the channel direction.

In yet another aspect, some examples include a computing system including one or more processors and memory coupled to the one or more processors, the memory storing instructions configured to be executed by the one or more processors, the instructions when executed by the on or more processors, perform any of the methods described herein (e.g., C1-C5 described above).

In yet another aspect, some examples include a non-transitory computer-readable storage medium storing one or more programs for execution by one or more processors of a storage device, the one or more programs including instructions for performing any of the methods described herein (e.g., C1-C5 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for inpainting a sequence of initial image frames, the method comprising:
   receiving initial video data representing a sequence of initial image frames;
   generating optical flow displacement values between neighboring image frames of the sequence of initial image frames;
   generating optical flow validity masks for respective image frames of the sequence of image frames based on the optical flow displacement values by:
   mapping a first pixel at a first pixel location in a first image frame to a corresponding pixel in a second pixel location in a second image frame using a backward optical flow displacement vector and pixel values of the first pixel;

mapping the corresponding pixel in the second pixel location in the second image frame to another corresponding pixel in a third pixel location in the first image frame using a forward optical flow displacement vector and the pixel values of the first pixel; and determining a distance between the first pixel location in the first image frame and the third pixel location in the first image frame;

warp-shifting image features from image feature maps of one or more neighboring image frames to image feature maps of a current image frame using the optical flow displacement values;

selecting the warp-shifted image features from the image feature maps of the one or more neighboring image frames and image features from the image feature maps of the current image frame based on one or more of the generated optical flow validity masks; and generating a sequence of complete image frames based on warp-shifted image features from the feature maps of the one or more neighboring image frames and image features from the image feature maps of the current image frame, the sequence of complete image frames including an inpainted version of the sequence of initial image frames.

2. The method of claim 1,
wherein the sequence of complete image frames is based on the selected warp-shifted image features from the feature maps of the one or more neighboring image frames and the selected image features from the image feature maps of the current image frame.

3. The method of claim 1, wherein warp-shifting image features from image feature maps of one or more neighboring image frames to image feature maps of a current image frame includes:
   temporally shifting features from a first image feature map in a first channel of a previous image frame to the current image frame;
   temporally shifting features from a second image feature map in a second channel of a subsequent image frame to the current image frame;
   warping the shifted image features from the first image feature map in the first channel to a time consistent with the current image frame; and
   warping the shifted image features from the second image feature map in the second channel to the time consistent with the current image frame.

4. The method of claim 1, further comprising indicating that optical flow displacement values associated with the first pixel location in the first image frame are valid when the determined distance between the first pixel location in the first image frame and the second pixel location in the first image frame is less than a threshold distance value.

5. The method of claim 1, further comprising:
   providing the optical flow displacement values and the optical flow validity mask to a trained convolutional neural network model including a plurality of encoding layers and a plurality of decoding layers; and
   at one or more encoding layers of the plurality of encoding layers and one or more decoding layers of the plurality of decoding layers:
      warp-shifting image features from an image feature map of a first channel of a first neighboring image frame to the image feature maps of the current image frame using the optical flow displacement value;
      warp-shifting image features from an image feature map of a second channel of a second neighboring image frame to the image feature maps of the current image frame using the optical flow displacement value; and
      concatenating the feature maps along the channel dimension.

6. The method of claim 5, further comprising:
   applying a convolution operation to the concatenated feature maps; and
   combining the results of the convolution operation applied to the concatenated feature maps with a gating signal.

7. A system configured to perform video inpainting, the system comprising:
   a processor; and
   memory including instructions, which when executed by the processor, causes the processor to:
      receive initial video data representing a sequence of initial image frames;
      generate optical flow displacement values between neighboring image frames of the sequence of initial image frames;
      generate optical flow validity masks for respective image frames of the sequence of image frames based on the optical flow displacement values by:
         mapping a first pixel at a first pixel location in a first image frame to a corresponding pixel in a second pixel location in a second image frame using a backward optical flow displacement vector and pixel values of the first pixel;
         mapping the corresponding pixel in the second pixel location in the second image frame to another corresponding pixel in a third pixel location in the first image frame using a forward optical flow displacement vector and the pixel values of the first pixel; and
         determining a distance between the first pixel location in the first image frame and the third pixel location in the first image frame;
      at one or more encoding layers and at one or more decoding layers of a trained convolutional neural network, warp-shift image features from image feature maps of one or more neighboring image frames to image feature maps of a current image frame using the optical flow displacement values;
      select the warp-shifted image features from the image feature maps of the one or more neighboring image frames and image features from the image feature maps of the current image frame based on one or more of the generated optical flow validity masks; and
      generate a sequence of complete image frames based on warp-shifted image features from the feature maps of the one or more neighboring image frames and image features from the image feature maps of the current image frame, the sequence of complete image frames including an inpainted version of the sequence of initial image frames.

8. The system of claim 7,
wherein the sequence of complete image frames is based on the selected warp-shifted image features from the feature maps of the one or more neighboring image frames and the selected image features from the image feature maps of the current image frame.

9. The system of claim 8, wherein the instructions, when executed by the processor, cause the processor to:

temporally shift features from a first image feature map in a first channel of a previous image frame to the current image frame;

temporally shift features from a second image feature map in a second channel of a subsequent image frame to the current image frame;

warp the shifted image features from the first image feature map in the first channel to a time consistent with the current image frame; and warp the shifted image features from the second image feature map in the second channel to the time consistent with the current image frame.

10. The system of claim 7, wherein the instructions, when executed by the processor, cause the processor to indicate that optical flow displacement values associated with the first pixel location in the first image frame are valid when the determined distance between the first pixel location in the first image frame and the second pixel location in the first image frame is less than a threshold distance value.

11. The system of claim 7, wherein the instructions, when executed by the processor, cause the processor to:

provide the optical flow displacement values and the optical flow validity mask to the trained convolutional neural network; and at one or more encoding layers of the plurality of encoding layers and one or more decoding layers of the plurality of decoding layers:

warp-shift image features from an image feature map of a first channel of a first neighboring image frame to the image feature maps of the current image frame using the optical flow displacement value;

warp-shift image features from an image feature map of a second channel of a second neighboring image frame to the image feature maps of the current image frame using the optical flow displacement value; and concatenate the feature maps along the channel dimension.

12. The system of claim 11, wherein the instructions, when executed by the processor, cause the processor to:

apply a convolution operation to the concatenated feature maps; and combine the results of the convolution operation applied to the concatenated feature maps with a gating signal.

13. The system of claim 7, wherein the instructions, when executed by the processor, cause the processor to provide the sequence of complete image frames to a computing system.

14. A non-transitory computer-readable storage medium including instructions, which when executed by a processor, cause the processor to:

receive initial video data representing a sequence of initial image frames;

generate optical flow displacement values between neighboring image frames of the sequence of initial image frames;

generate optical flow validity masks for respective image frames of the sequence of image frames based on the optical flow displacement values by:

mapping a first pixel at a first pixel location in a first image frame to a corresponding pixel in a second pixel location in a second image frame using a backward optical flow displacement vector and pixel values of the first pixel;

mapping the corresponding pixel in the second pixel location in the second image frame to another corresponding pixel in a third pixel location in the first image frame using a forward optical flow displacement vector and the pixel values of the first pixel; and determining a distance between the first pixel location in the first image frame and the third pixel location in the first image frame;

warp-shift image features from image feature maps of one or more neighboring image frames to image feature maps of a current image frame using the optical flow displacement values;

select warp-shifted image features from the feature maps of the one or more neighboring image frames and image features from the image feature maps of the current image frame based on one or more of the optical flow validity masks; and generate a sequence of complete image frames based on the selected warp-shifted image features from the feature maps of the one or more neighboring image frames and the selected image features from the image feature maps of the current image frame, the sequence of complete image frames including an inpainted version of the sequence of initial image frames.

15. The non-transitory computer-readable storage medium of claim 14, wherein warp-shifting image features from image feature maps of one or more neighboring image frames to image feature maps of a current image frame includes:

temporally shifting features from a first image feature map in a first channel of a previous image frame to the current image frame;

temporally shifting features from a second image feature map in a second channel of a subsequent image frame to the current image frame;

warping the shifted image features from the first image feature map in the first channel to a time consistent with the current image frame; and warping the shifted image features from the second image feature map in the second channel to the time consistent with the current image frame.

16. The non-transitory computer-readable storage medium of claim 14, further comprising instructions, which when executed by the processor, cause the processor to indicate that optical flow displacement values associated with the first pixel location in the first image frame are valid when the determined distance between the first pixel location in the first image frame and the second pixel location in the first image frame is less than a threshold distance value.

17. The non-transitory computer-readable storage medium of claim 14, further comprising instructions, which when executed by the processor, cause the processor to:

provide the optical flow displacement values and the optical flow validity mask to a trained convolutional neural network model including a plurality of encoding layers and a plurality of decoding layers;

warp-shift image features from an image feature map of a first channel of a first neighboring image frame to the image feature maps of the current image frame using the optical flow displacement value at one or more encoding layers of the plurality of encoding layers and one or more decoding layers of the plurality of decoding layers;

warp-shift image features from an image feature map of a second channel of a second neighboring image frame to the image feature maps of the current image frame using the optical flow displacement value at one or more encoding layers of the plurality of encoding layers and one or more decoding layers of the plurality of decoding layers; and
concatenate the feature maps along the channel direction.

* * * * *